US012640787B2

(12) United States Patent
Kotdiya et al.

(10) Patent No.: US 12,640,787 B2
(45) Date of Patent: May 26, 2026

(54) BEAM PROCESSING ARCHITECTURE IN WIRELESS COMMUNICATION SYSTEMS

(71) Applicant: Rakuten Symphony, Inc., Tokyo (JP)

(72) Inventors: Regal Kotdiya, Bangalore (IN); Christopher Cornish, Weybridge (GB)

(73) Assignee: RAKUTEN SYMPHONY, INC., Tokyo (JP)

( * ) Notice: Subject to any disclaimer, the term of this patent is extended or adjusted under 35 U.S.C. 154(b) by 982 days.

(21) Appl. No.: 17/793,597

(22) PCT Filed: Jun. 28, 2022

(86) PCT No.: PCT/US2022/035261

§ 371 (c)(1),
(2) Date: Jan. 4, 2024

(87) PCT Pub. No.: WO2024/005788

PCT Pub. Date: Jan. 4, 2024

(65) Prior Publication Data

US 2024/0223248 A1     Jul. 4, 2024

(51) Int. Cl.
*H04B 7/06* (2006.01)
*H04L 27/10* (2006.01)

(52) U.S. Cl.
CPC ........... *H04B 7/0617* (2013.01); *H04L 27/10* (2013.01)

(58) Field of Classification Search
CPC ............................... H04B 7/0617; H04L 27/10
See application file for complete search history.

(56) References Cited

U.S. PATENT DOCUMENTS

| | | | |
|---|---|---|---|
| 6,985,516 B1 | 1/2006 | Easton et al. | |
| 2003/0147655 A1* | 8/2003 | Shattil | H04L 27/00 |
| | | | 398/76 |
| 2011/0275376 A1 | 11/2011 | Boldi et al. | |
| 2012/0121023 A1* | 5/2012 | Antia | H04N 7/20 |
| | | | 375/240.24 |
| 2021/0120104 A1 | 4/2021 | Al-Mufti | |

(Continued)

OTHER PUBLICATIONS

ECPRI Specification V2.0, "Common Public Radio Interface: eCPRI Interface Specification," May 10, 2019.

(Continued)

*Primary Examiner* — Congvan Tran
(74) *Attorney, Agent, or Firm* — Sughrue Mion, PLLC

(57) ABSTRACT

A method, a system, and a computer program product for processing of data signals in a wireless communication system. An input data signal having a plurality of portions of antenna carrier symbols is received. One or more beam weights are assigned to one or more antenna carrier symbols in each portion in the plurality of portions of antenna carrier symbols. Each antenna carrier symbol is processed using at least one assigned beam weight in the one or more assigned beam weights to generate a processed portion of antenna carrier symbols. The processed portion of antenna carrier symbols is stored while performing the processing of another portion of antenna carrier symbols in the plurality of portions of antenna carrier symbols. The stored processed portion of antenna carrier symbols is combined with the processed another portion of antenna carrier symbols to generate an output data signal.

20 Claims, 15 Drawing Sheets

(56) References Cited

U.S. PATENT DOCUMENTS

2021/0120531 A1      4/2021   Jeon et al.
2024/0397486 A1*   11/2024   Zhao ..................... H04L 47/628

OTHER PUBLICATIONS

Common Public Radio Interface (CPRI); Interface Specification <Downloaded from the internet: http://cpri.info.downloads/CPRI_ v_4_0_2008-06-30.pdf>, downloaded on: Aug. 30, 2022, date of publication: Jun. 20, 2008.
International Search Report and Written Opinion for Intl. Pat. App. No. PCT/US22/35261 dated Oct. 5, 2022.

* cited by examiner

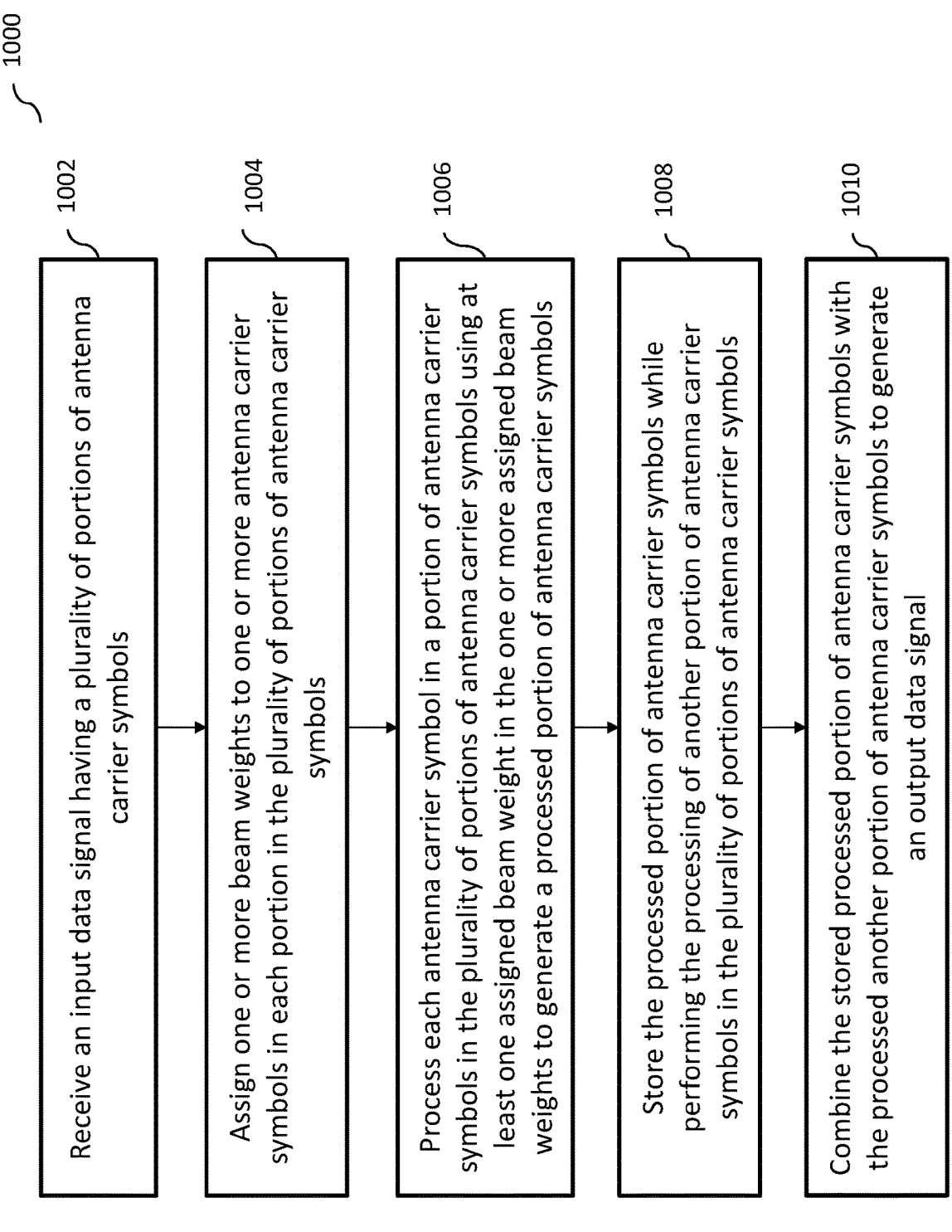

1002 — Receive an input data signal having a plurality of portions of antenna carrier symbols 1004 — Assign one or more beam weights to one or more antenna carrier symbols in each portion in the plurality of portions of antenna carrier symbols 1006 — Process each antenna carrier symbol in a portion of antenna carrier symbols in the plurality of portions of antenna carrier symbols using at least one assigned beam weight in the one or more assigned beam weights to generate a processed portion of antenna carrier symbols 1008 — Store the processed portion of antenna carrier symbols while performing the processing of another portion of antenna carrier symbols in the plurality of portions of antenna carrier symbols 1010 — Combine the stored processed portion of antenna carrier symbols with the processed another portion of antenna carrier symbols to generate an output data signal

BEAM PROCESSING ARCHITECTURE IN WIRELESS COMMUNICATION SYSTEMS

CROSS-REFERENCE TO RELATED APPLICATIONS

The present application claims priority to and is the 35 U.S.C. 371 United States National Phase application based on International Patent Application No. PCT/US22/35261, filed on Jun. 28, 2022, entitled "BEAM PROCESSING ARCHITECTURE IN WIRELESS COMMUNICATION SYSTEMS," which is hereby incorporated by reference in its entirety.

TECHNICAL FIELD

In some implementations, the current subject matter relates to telecommunications systems, and in particular, to beam processing architecture in wireless communication systems.

BACKGROUND

In today's world, cellular networks provide on-demand communications capabilities to individuals and business entities. Typically, a cellular network is a wireless network that can be distributed over land areas, which are called cells. Each such cell is served by at least one fixed-location transceiver, which is referred to as a cell site or a base station. Each cell can use a different set of frequencies than its neighbor cells in order to avoid interference and provide improved service within each cell. When cells are joined together, they provide radio coverage over a wide geographic area, which enables a large number of mobile telephones, and/or other wireless devices or portable transceivers to communicate with each other and with fixed transceivers and telephones anywhere in the network. Such communications are performed through base stations and are accomplished even if the mobile transceivers are moving through more than one cell during transmission. Major wireless communications providers have deployed such cell sites throughout the world, thereby allowing communications mobile phones and mobile computing devices to be connected to the public switched telephone network and public Internet.

A mobile telephone is a portable telephone that is capable of receiving and/or making telephone and/or data calls through a cell site or a transmitting tower by using radio waves to transfer signals to and from the mobile telephone. In view of a large number of mobile telephone users, current mobile telephone networks provide a limited and shared resource. In that regard, cell sites and handsets can change frequency and use low power transmitters to allow simultaneous usage of the networks by many callers with less interference. Coverage by a cell site can depend on a particular geographical location and/or a number of users that can potentially use the network. For example, in a city, a cell site can have a range of up to approximately ½ mile; in rural areas, the range can be as much as 5 miles; and in some areas, a user can receive signals from a cell site 25 miles away.

The following are examples of some of the digital cellular technologies that are in use by the communications providers: Global System for Mobile Communications ("GSM"), General Packet Radio Service ("GPRS"), cdmaOne, CDMA2000, Evolution-Data Optimized ("EV-DO"), Enhanced Data Rates for GSM Evolution ("EDGE"), Universal Mobile Telecommunications System ("UMTS"), Digital Enhanced Cordless Telecommunications ("DECT"), Digital AMPS ("IS-136/TDMA"), and Integrated Digital Enhanced Network ("iDEN"). The Long Term Evolution, or 4G LTE, which was developed by the Third Generation Partnership Project ("3GPP") standards body, is a standard for a wireless communication of high-speed data for mobile phones and data terminals. A 5G standard is currently being developed and deployed. 3GPP cellular technologies like LTE and 5G NR are evolutions of earlier generation 3GPP technologies like the GSM/EDGE and UMTS/HSPA digital cellular technologies and allows for increasing capacity and speed by using a different radio interface together with core network improvements.

Cellular networks can be divided into radio access networks and core networks. The radio access network (RAN) can include network functions that can handle radio layer communications processing. The core network can include network functions that can handle higher layer communications, e.g., internet protocol (IP), transport layer and applications layer. In some cases, the RAN functions can be split into baseband unit functions and the radio unit functions, where a radio unit connected to a baseband unit via a fronthaul network, for example, can be responsible for lower layer processing of a radio physical layer while a baseband unit can be responsible for the higher layer radio protocols, e.g., MAC, RLC, etc.

SUMMARY

In some implementations, the current subject matter relates to a computer-implemented method for processing of data signals in a wireless communication systems. The method may include receiving an input data signal having a plurality of portions of antenna carrier symbols, assigning one or more beam weights to one or more antenna carrier symbols in each portion in the plurality of portions of antenna carrier symbols, processing each antenna carrier symbol in a portion of antenna carrier symbols in the plurality of portions of antenna carrier symbols using at least one assigned beam weight in one or more assigned beam weights to generate a processed portion of antenna carrier symbols, storing the processed portion of antenna carrier symbols while performing the processing of another portion of antenna carrier symbols in the plurality of portions of antenna carrier symbols, and combining the stored processed portion of antenna carrier symbols with the processed another portion of antenna carrier symbols to generate an output data signal.

In some implementations, the current subject matter can include one or more of the following optional features. In some implementations, each portion of antenna carrier symbols may be processed serially. Further, each antenna carrier symbol may be processed by multiplying at least one assigned beam weight by each antenna carrier symbol to generate the processed portion of antenna carrier symbols. The stored processed portion of antenna carrier symbols may be added to the processed antenna carrier symbols in another portion of antenna carrier symbols. In some implementations, the combination of processed antenna carrier symbol from different portions may include adding all processed portions in the plurality of antenna carrier symbols in the input data signal, and generating the output signal using all added processed portions.

In some implementations, the beam processing architecture may be further configured to temporarily store, e.g., in a memory location, each portion in the plurality of portions of antenna carrier symbols prior to the processing. The architecture may further discard temporarily stored portion of antenna carrier symbols upon processing of that portion from the memory location, and temporarily store, e.g., in the memory location, another portion in the plurality of portions of antenna carrier symbols after discarding.

In some implementations, the architecture may include a base station that may be configured to receive input signals, assign beam weights, process antenna carrier symbols, store processed symbols, and then combine newly processed symbols with already processed stored symbols. The base station may include at least one of the following communication components: one or more remote radio units, one or more radio interface units, and one or more distributed units. One or more radio interface units may be configured to perform at least one of the following: receive the input data signal, transmit the generated output data signal, and any combination thereof. The base station may be an eNodeB base station, a gNodeB base station, and/or any combination thereof. Further, the base station may be operating in a long term evolution communications system and/or a new radio communications system.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 1b illustrates further detail of the exemplary LTE system shown in FIG. 1a;

FIG. 1c illustrates additional detail of the evolved packet core of the exemplary LTE system shown in FIG. 1a;

FIG. 1d illustrates an exemplary evolved Node B of the exemplary LTE system shown in FIG. 1a;

FIG. 3 illustrates an exemplary virtual radio access network, according to some implementations of the current subject matter;

FIG. 10 illustrates an exemplary method, according to some implementations of the current subject matter.

DETAILED DESCRIPTION

The current subject matter can provide for systems and methods that can be implemented in wireless communications systems. Such systems can include various wireless communications systems, including 5G New Radio communications systems, long term evolution communication systems, etc.

In some implementations, the current subject matter relates to a beamforming architecture and associated methods. The current subject matter may be configured to receive an input data signal having a plurality of portions of antenna carrier symbols. One or more beam weights may be assigned to one or more antenna carrier symbols in each portion in the plurality of portions of antenna carrier symbols. The architecture may be configured to process each antenna carrier symbol using at least one assigned beam weight to generate a processed portion of antenna carrier symbols. The processing may be executed using one or more processing elements, such as for example, digital processing elements (DSPs), which perform complex-multiple-accumulate processing functions. The processed portion of antenna carrier symbols may be stored while processing of another portion of antenna carrier symbols in the plurality of portions of antenna carrier symbols is being performed. The stored processed carrier symbols may be combined with the processed carrier symbols from another portion of antenna carrier symbols to generate an output data signal.

One or more aspects of the current subject matter can be incorporated into transmitter and/or receiver components of base stations (e.g., gNodeBs, eNodeBs, etc.) in such communications systems. The following is a general discussion of long-term evolution communications systems and 5G New Radio communication systems.

I. Long Term Evolution Communications System

FIGS. 1a-c and 2 illustrate an exemplary conventional long-term evolution ("LTE") communication system 100 along with its various components. An LTE system or a 4G LTE, as it is commercially known, is governed by a standard for wireless communication of high-speed data for mobile telephones and data terminals. The standard is an evolution of the GSM/EDGE ("Global System for Mobile Communications"/"Enhanced Data rates for GSM Evolution") as well as UMTS/HSPA ("Universal Mobile Telecommunications System"/"High Speed Packet Access") network technologies. The standard was developed by the 3GPP ("3rd Generation Partnership Project").

Figure 1A:
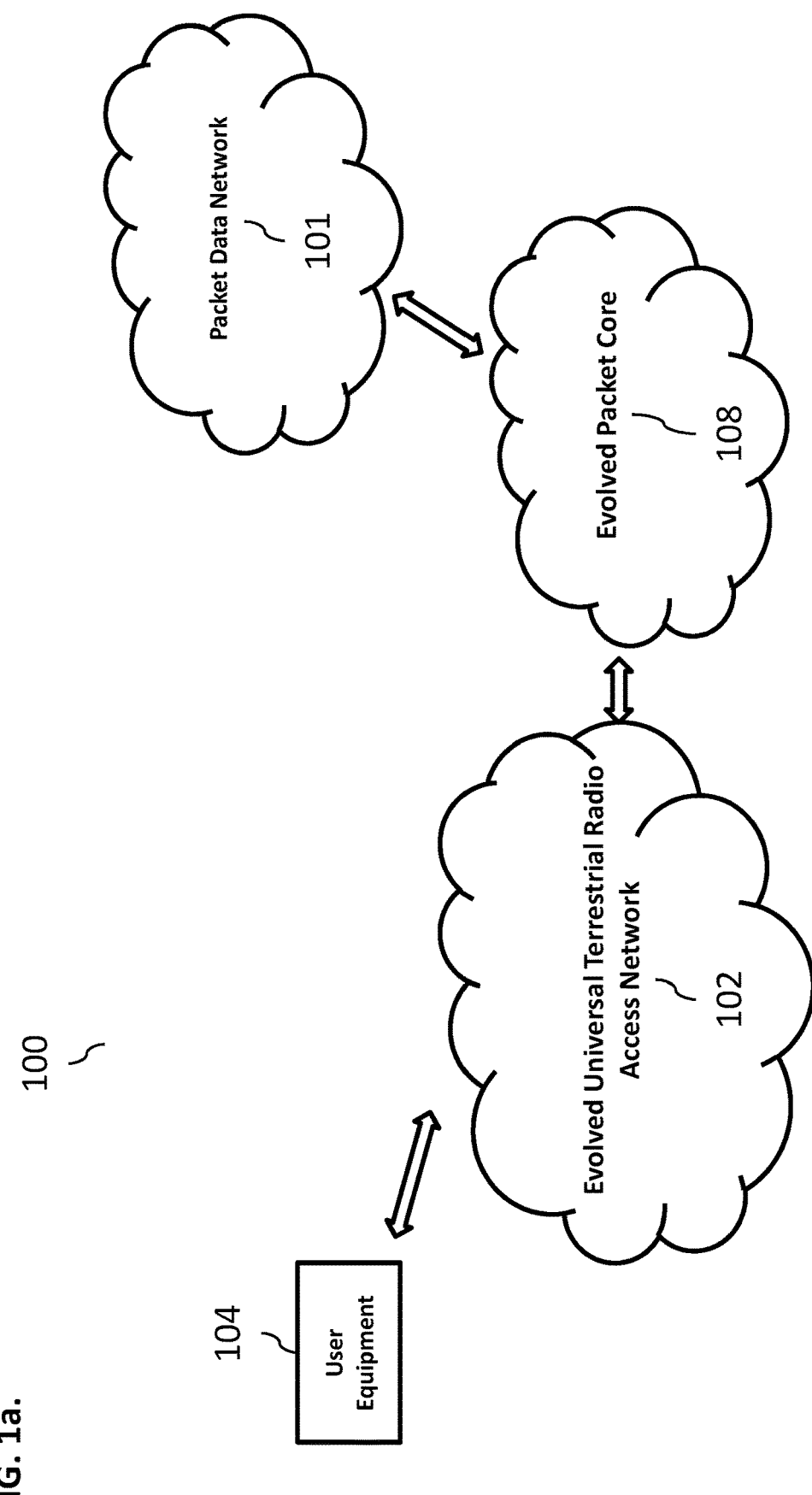
FIG. 1a illustrates an exemplary conventional long term evolution ("LTE") communications system.
Figure 1B:
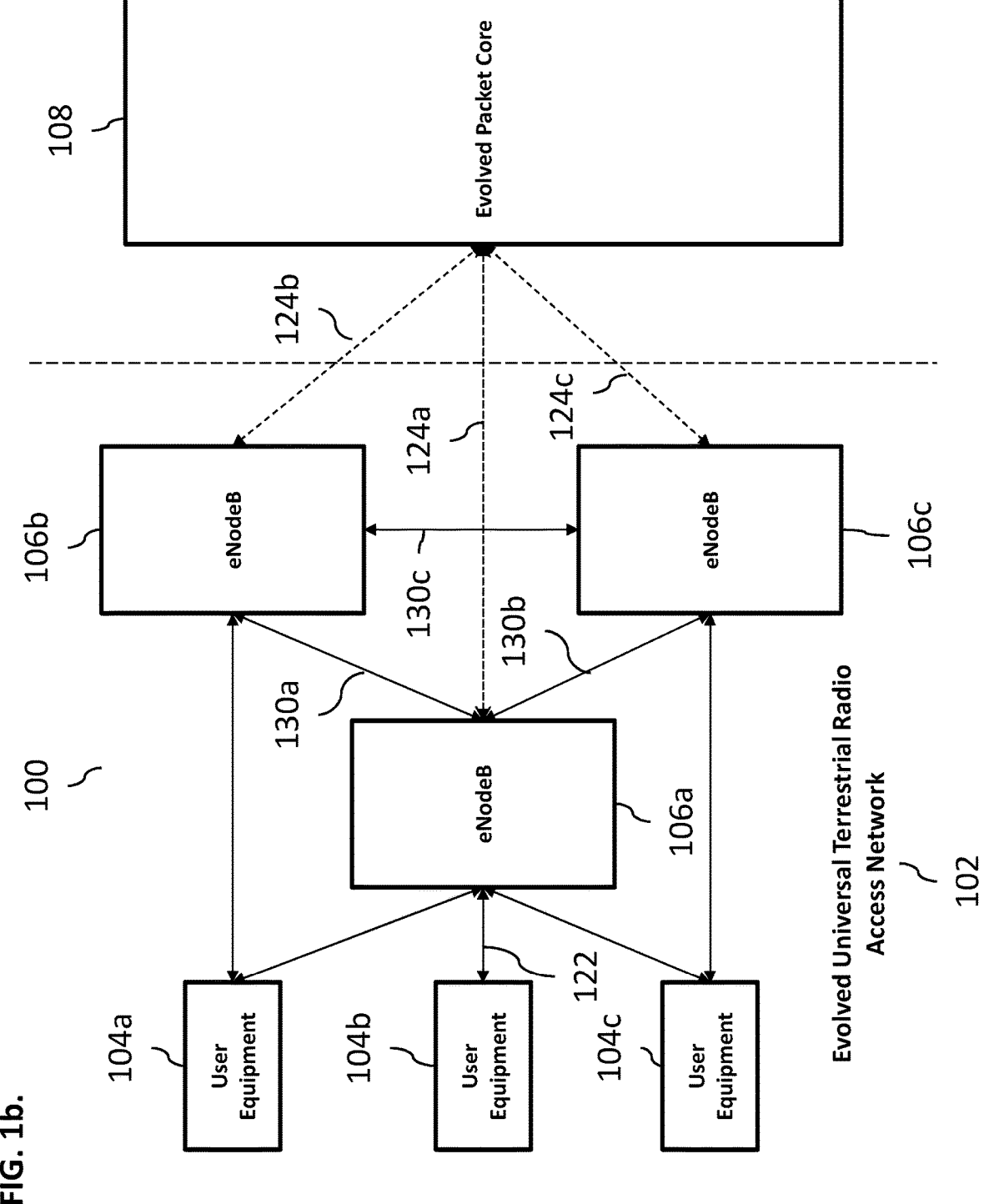

As shown in FIG. 1a, the system 100 can include an evolved universal terrestrial radio access network ("EUTRAN") 102, an evolved packet core ("EPC") 108, and a packet data network ("PDN") 101, where the EUTRAN 102 and EPC 108 provide communication between a user equipment 104 and the PDN 101. The EUTRAN 102 can include a plurality of evolved node B's ("eNodeB" or "ENODEB" or "enodeb" or "eNB") or base stations 106 (a, b, c) (as shown in FIG. 1b) that provide communication capabilities to a plurality of user equipment 104(a, b, c). The user equipment 104 can be a mobile telephone, a smartphone, a tablet, a personal computer, a personal digital assistant ("PDA"), a server, a data terminal, and/or any other type of user equipment, and/or any combination thereof. The user equipment 104 can connect to the EPC 108 and eventually, the PDN 101, via any eNodeB 106. Typically, the user equipment 104 can connect to the nearest, in terms of distance, eNodeB 106. In the LTE system 100, the EUTRAN 102 and EPC 108 work together to provide connectivity, mobility and services for the user equipment 104.

Figure 1C:
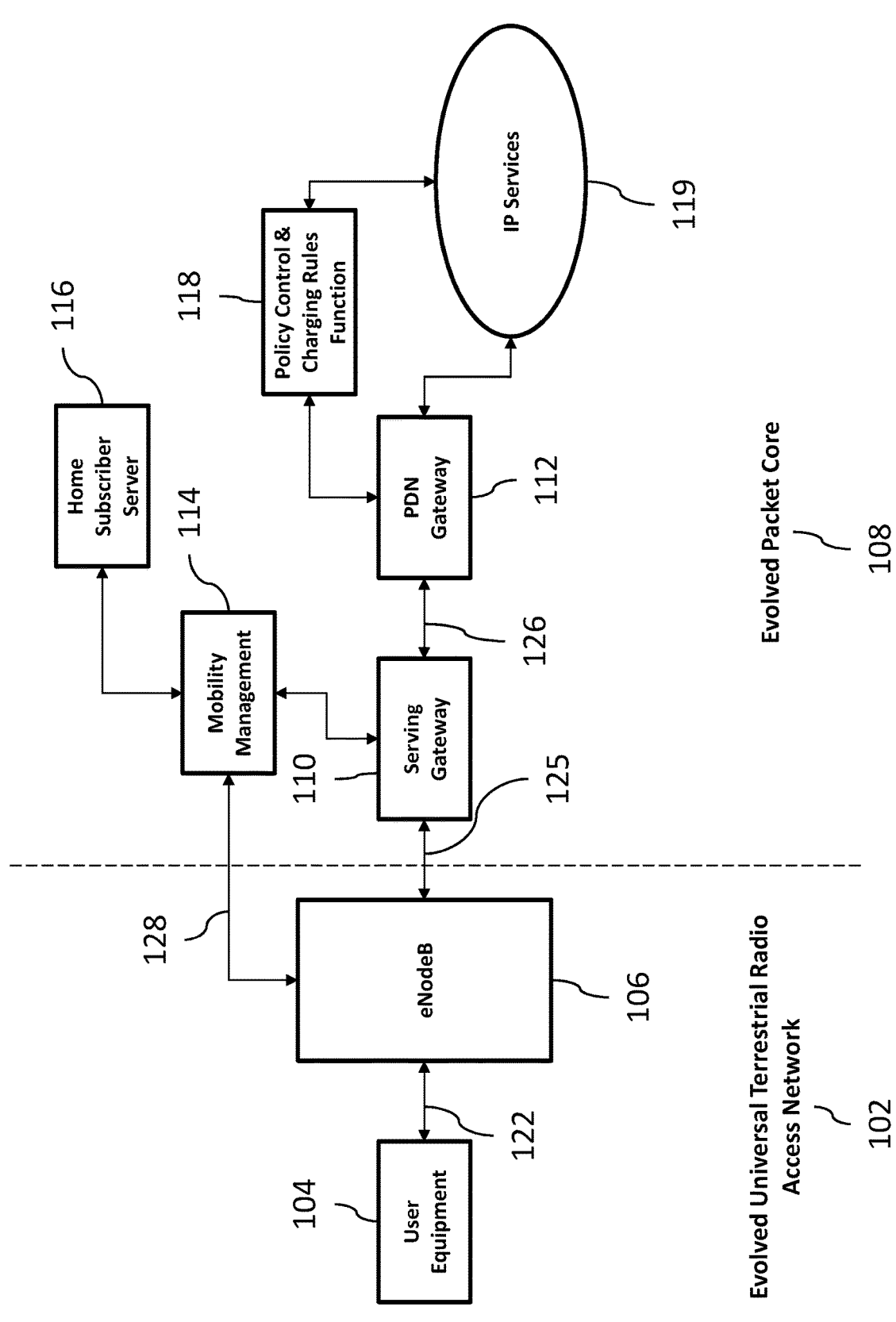

FIG. 1b illustrates further detail of the network 100 shown in FIG. 1a. As stated above, the EUTRAN 102 includes a plurality of eNodeBs 106, also known as cell sites. The eNodeBs 106 provides radio functions and performs key control functions including scheduling of air link resources or radio resource management, active mode mobility or handover, and admission control for services. The eNodeBs 106 are responsible for selecting which mobility management entities (MMEs, as shown in FIG. 1c) will serve the user equipment 104 and for protocol features like header compression and encryption. The eNodeBs 106 that make up an EUTRAN 102 collaborate with one another for radio resource management and handover.

Communication between the user equipment 104 and the eNodeB 106 occurs via an air interface 122 (also known as "LTE-Uu" interface). As shown in FIG. 1b, the air interface 122 provides communication between user equipment 104b and the eNodeB 106a. The air interface 122 uses Orthogonal Frequency Division Multiple Access ("OFDMA") and Single Carrier Frequency Division Multiple Access ("SC-FDMA"), an OFDMA variant, on the downlink and uplink respectively. OFDMA allows use of multiple known antenna techniques, such as, Multiple Input Multiple Output ("MIMO").

The air interface 122 uses various protocols, which include a radio resource control ("RRC") for signaling between the user equipment 104 and eNodeB 106 and non-access stratum ("NAS") for signaling between the user equipment 104 and MME (as shown in FIG. 1c). In addition to signaling, user traffic is transferred between the user equipment 104 and eNodeB 106. Both signaling and traffic in the system 100 are carried by physical layer ("PHY") channels.

Multiple eNodeBs 106 can be interconnected with one another using an X2 interface 130(a, b, c). As shown in FIG. 1a, X2 interface 130a provides interconnection between eNodeB 106a and eNodeB 106b; X2 interface 130b provides interconnection between eNodeB 106a and eNodeB 106c; and X2 interface 130c provides interconnection between eNodeB 106b and eNodeB 106c. The X2 interface can be established between two eNodeBs in order to provide an exchange of signals, which can include a load- or interference-related information as well as handover-related information. The eNodeBs 106 communicate with the evolved packet core 108 via an S1 interface 124(a, b, c). The S1 interface 124 can be split into two interfaces: one for the control plane (shown as control plane interface (S1-MME interface) 128 in FIG. 1c) and the other for the user plane (shown as user plane interface (S1-U interface) 125 in FIG. 1c).

The EPC 108 establishes and enforces Quality of Service ("QoS") for user services and allows user equipment 104 to maintain a consistent internet protocol ("IP") address while moving. It should be noted that each node in the network 100 has its own IP address. The EPC 108 is designed to interwork with legacy wireless networks. The EPC 108 is also designed to separate control plane (i.e., signaling) and user plane (i.e., traffic) in the core network architecture, which allows more flexibility in implementation, and independent scalability of the control and user data functions.

The EPC 108 architecture is dedicated to packet data and is shown in more detail in FIG. 1c. The EPC 108 includes a serving gateway (S-GW) 110, a PDN gateway (P-GW) 112, a mobility management entity ("MME") 114, a home subscriber server ("HSS") 116 (a subscriber database for the EPC 108), and a policy control and charging rules function ("PCRF") 118. Some of these (such as S-GW, P-GW, MME, and HSS) are often combined into nodes according to the manufacturer's implementation.

The S-GW 110 functions as an IP packet data router and is the user equipment's bearer path anchor in the EPC 108. Thus, as the user equipment moves from one eNodeB 106 to another during mobility operations, the S-GW 110 remains the same and the bearer path towards the EUTRAN 102 is switched to talk to the new eNodeB 106 serving the user equipment 104. If the user equipment 104 moves to the domain of another S-GW 110, the MME 114 will transfer all of the user equipment's bearer paths to the new S-GW. The S-GW 110 establishes bearer paths for the user equipment to one or more P-GWs 112. If downstream data are received for an idle user equipment, the S-GW 110 buffers the downstream packets and requests the MME 114 to locate and reestablish the bearer paths to and through the EUTRAN 102.

The P-GW 112 is the gateway between the EPC 108 (and the user equipment 104 and the EUTRAN 102) and PDN 101 (shown in FIG. 1a). The P-GW 112 functions as a router for user traffic as well as performs functions on behalf of the user equipment. These include IP address allocation for the user equipment, packet filtering of downstream user traffic to ensure it is placed on the appropriate bearer path, enforcement of downstream QoS, including data rate. Depending upon the services a subscriber is using, there may be multiple user data bearer paths between the user equipment 104 and P-GW 112. The subscriber can use services on PDNs served by different P-GWs, in which case the user equipment has at least one bearer path established to each P-GW 112. During handover of the user equipment from one eNodeB to another, if the S-GW 110 is also changing, the bearer path from the P-GW 112 is switched to the new S-GW.

The MME 114 manages user equipment 104 within the EPC 108, including managing subscriber authentication, maintaining a context for authenticated user equipment 104, establishing data bearer paths in the network for user traffic, and keeping track of the location of idle mobiles that have not detached from the network. For idle user equipment 104 that needs to be reconnected to the access network to receive downstream data, the MME 114 initiates paging to locate the user equipment and re-establishes the bearer paths to and through the EUTRAN 102. MME 114 for a particular user equipment 104 is selected by the eNodeB 106 from which the user equipment 104 initiates system access. The MME is typically part of a collection of MMEs in the EPC 108 for the purposes of load sharing and redundancy. In the establishment of the user's data bearer paths, the MME 114 is responsible for selecting the P-GW 112 and the S-GW 110, which will make up the ends of the data path through the EPC 108.

The PCRF 118 is responsible for policy control decision-making, as well as for controlling the flow-based charging functionalities in the policy control enforcement function ("PCEF"), which resides in the P-GW 110. The PCRF 118 provides the QoS authorization (QoS class identifier ("QCI") and bit rates) that decides how a certain data flow will be treated in the PCEF and ensures that this is in accordance with the user's subscription profile.

As stated above, the IP services 119 are provided by the PDN 101 (as shown in FIG. 1*a*).

Figure 1D:
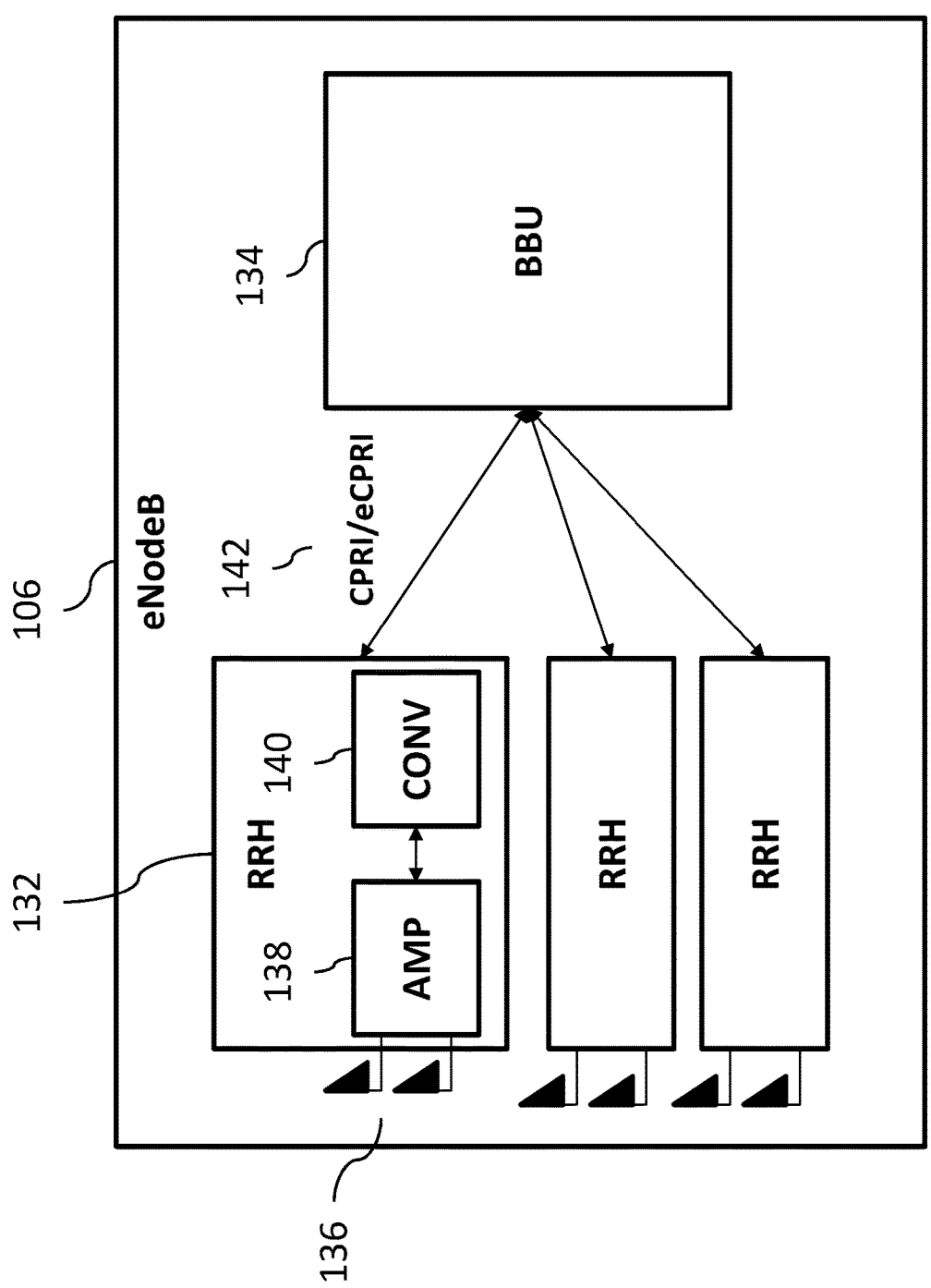

FIG. 1*d* illustrates an exemplary structure of eNodeB 106. The eNodeB 106 can include at least one remote radio head ("RRH") 132 (typically, there can be three RRH 132) and a baseband unit ("BBU") 134. The RRH 132 can be connected to antennas 136. The RRH 132 and the BBU 134 can be connected using an optical interface that is compliant with common public radio interface ("CPRI")/enhanced CPRI ("eCPRI") 142 standard specification either using RRH specific custom control and user plane framing methods or using O-RAN Alliance compliant Control and User plane framing methods. The operation of the eNodeB 106 can be characterized using the following standard parameters (and specifications): radio frequency band (Band4, Band9, Band17, etc.), bandwidth (5, 10, 15, 20 MHz), access scheme (downlink: OFDMA; uplink: SC-OFDMA), antenna technology (Single user and multi user MIMO; Uplink: Single user and multi user MIMO), number of sectors (6 maximum), maximum transmission rate (downlink: 150 Mb/s; uplink: 50 Mb/s), S1/X2 interface (1000Base-SX, 1000Base-T), and mobile environment (up to 350 km/h). The BBU 134 can be responsible for digital baseband signal processing, termination of S1 line, termination of X2 line, call processing and monitoring control processing. IP packets that are received from the EPC 108 (not shown in FIG. 1*d*) can be modulated into digital baseband signals and transmitted to the RRH 132. Conversely, the digital baseband signals received from the RRH 132 can be demodulated into IP packets for transmission to EPC 108.

The RRH 132 can transmit and receive wireless signals using antennas 136. The RRH 132 can convert (using converter ("CONV") 140) digital baseband signals from the BBU 134 into radio frequency ("RF") signals and power amplify (using amplifier ("AMP") 138) them for transmission to user equipment 104 (not shown in FIG. 1*d*). Conversely, the RF signals that are received from user equipment 104 are amplified (using AMP 138) and converted (using CONV 140) to digital baseband signals for transmission to the BBU 134.

Figure 2:
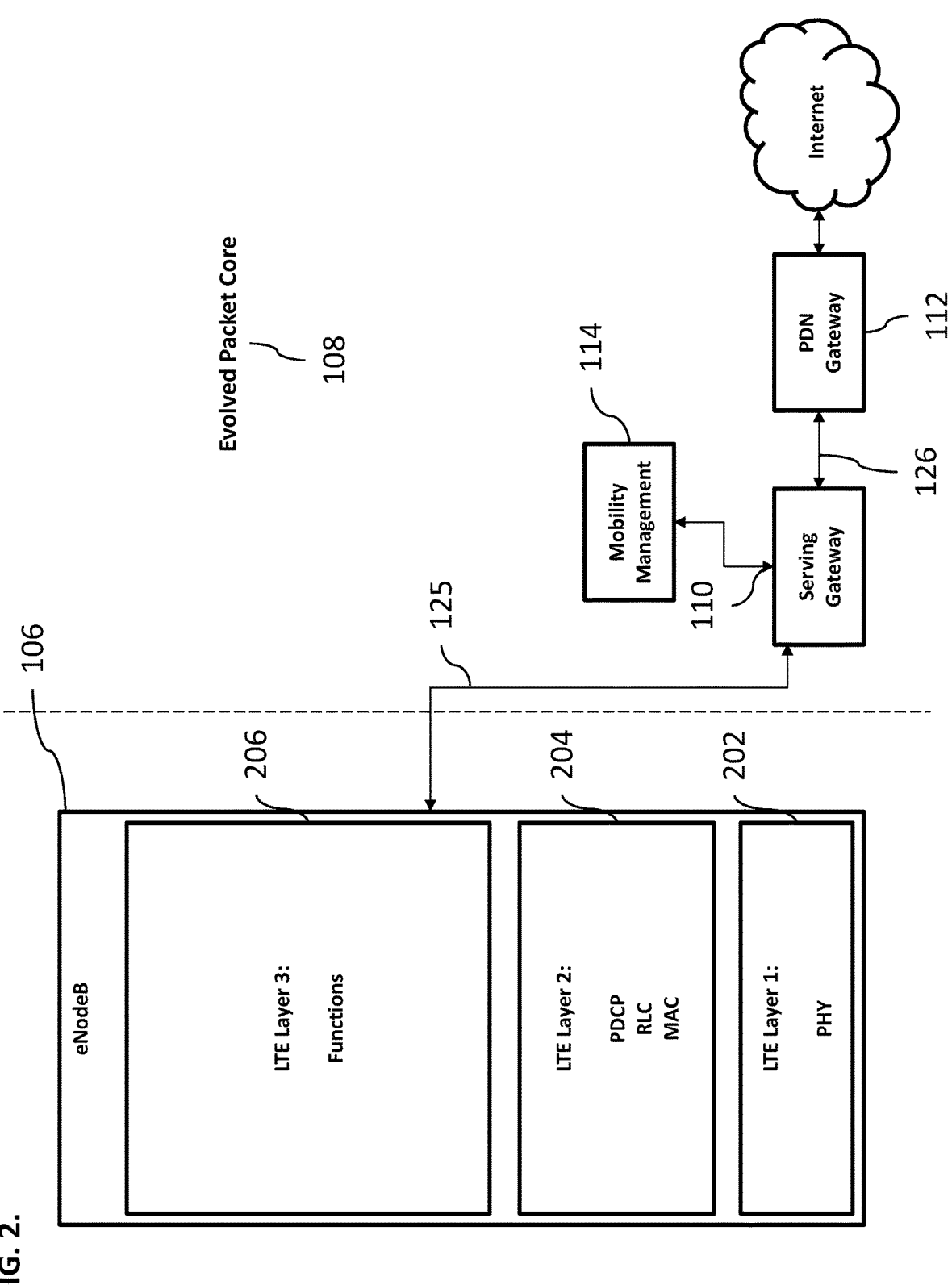
FIG. 2 illustrates further detail of an evolved Node B shown in FIGS. 1a-d.

FIG. 2 illustrates an additional detail of an exemplary eNodeB 106. The eNodeB 106 includes a plurality of layers: LTElayer 1 202, LTElayer 2 204, and LTElayer 3 206. The LTElayer 1 includes a physical layer ("PHY"). The LTElayer 2 includes a medium access control ("MAC"), a radio link control ("RLC"), a packet data convergence protocol ("PDCP"). The LTElayer 3 includes various functions and protocols, including a radio resource control ("RRC"), a dynamic resource allocation, eNodeB measurement configuration and provision, a radio admission control, a connection mobility control, and radio resource management ("RRM"). The RLC protocol is an automatic repeat request ("ARQ") fragmentation protocol used over a cellular air interface. The RRC protocol handles control plane signaling of LTElayer 3 between the user equipment and the EUTRAN. RRC includes functions for connection establishment and release, broadcast of system information, radio bearer establishment/reconfiguration and release, RRC connection mobility procedures, paging notification and release, and outer loop power control. The PDCP performs IP header compression and decompression, transfer of user data and maintenance of sequence numbers for Radio Bearers. The BBU 134, shown in FIG. 1*d*, can include LTElayers L1-L3.

One of the primary functions of the eNodeB 106 is radio resource management, which includes scheduling of both uplink and downlink air interface resources for user equipment 104, control of bearer resources, and admission control. The eNodeB 106, as an agent for the EPC 108, is responsible for the transfer of paging messages that are used to locate mobiles when they are idle. The eNodeB 106 also communicates common control channel information over the air, header compression, encryption and decryption of the user data sent over the air, and establishing handover reporting and triggering criteria. As stated above, the eNodeB 106 can collaborate with other eNodeB 106 over the X2 interface for the purposes of handover and interference management. The eNodeBs 106 communicate with the EPC's MME via the S1-MME interface and to the S-GW with the S1-U interface. Further, the eNodeB 106 exchanges user data with the S-GW over the S1-U interface. The eNodeB 106 and the EPC 108 have a many-to-many relationship to support load sharing and redundancy among MMEs and S-GWs. The eNodeB 106 selects an MME from a group of MMEs so the load can be shared by multiple MMEs to avoid congestion.

II. 5G NR Wireless Communications Networks

In some implementations, the current subject matter relates to a 5G new radio ("NR") communications system. The 5G NR is a next telecommunications standard beyond the 4G/IMT-Advanced standards. 5G networks offer at higher capacity than current 4G, allow higher number of mobile broadband users per area unit, and allow consumption of higher and/or unlimited data quantities in gigabyte per month and user. This can allow users to stream high-definition media many hours per day using mobile devices, even when it is not possible to do so with Wi-Fi networks. 5G networks have an improved support of device-to-device communication, lower cost, lower latency than 4G equipment and lower battery consumption, etc. Such networks have data rates of tens of megabits per second for a large number of users, data rates of 100 Mb/s for metropolitan areas, 1 Gb/s simultaneously to users within a confined area (e.g., office floor), a large number of simultaneous connections for wireless sensor networks, an enhanced spectral efficiency, improved coverage, enhanced signaling efficiency, 1-10 ms latency, reduced latency compared to existing systems.

Figure 3:
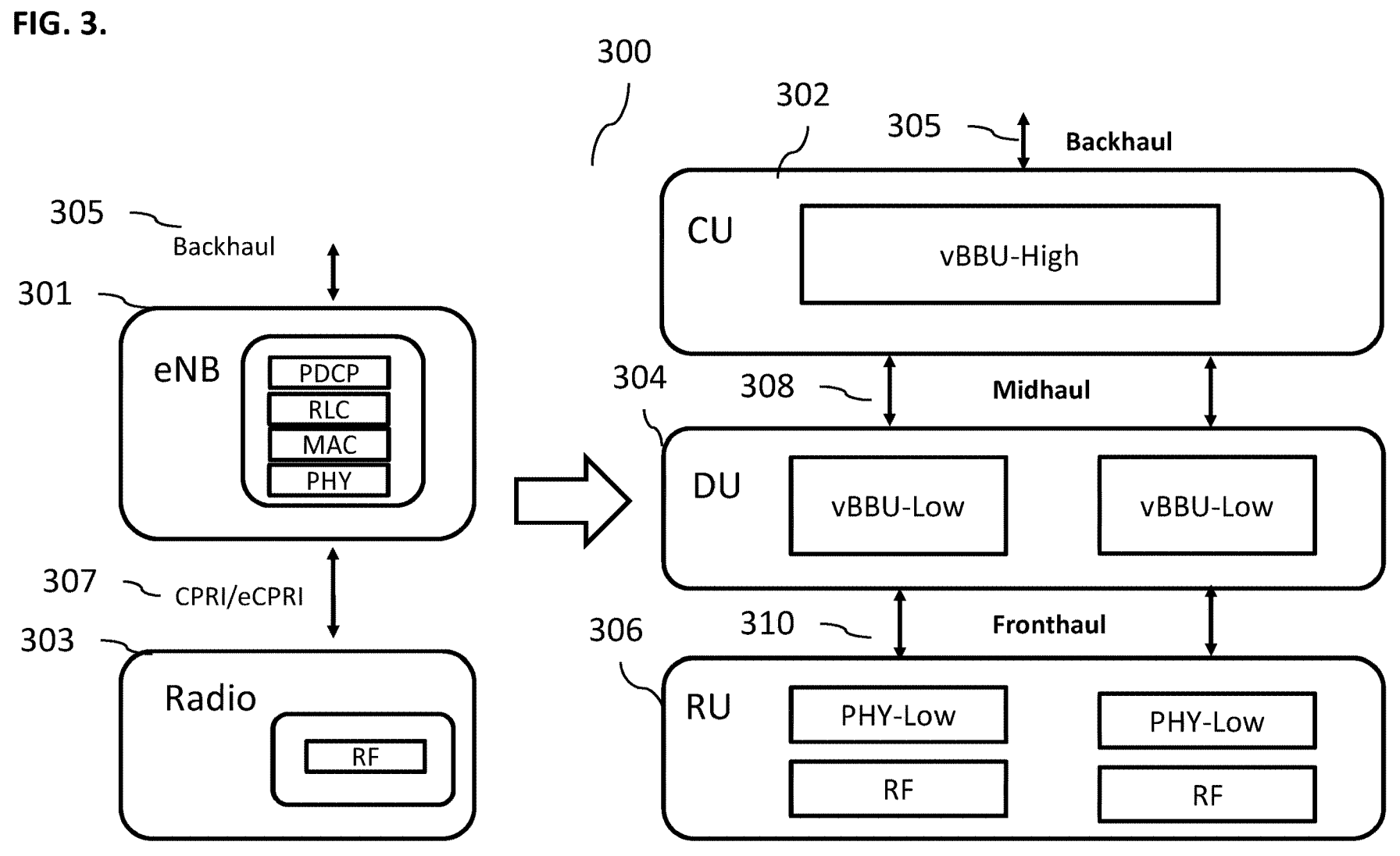

FIG. 3 illustrates an exemplary virtual radio access network 300. The network 300 can provide communications between various components, including a base station (e.g., eNodeB, gNodeB) 301, a radio equipment 307, a centralized unit 302, a digital unit 304, and a radio device 306. The components in the system 300 can be communicatively coupled to a core using a backhaul link 305. A centralized unit ("CU") 302 can be communicatively coupled to a distributed unit ("DU") 304 using a midhaul connection 308. The radio frequency ("RU") components 306 can be communicatively coupled to the DU 304 using a fronthaul connection 310.

In some implementations, the CU 302 can provide intelligent communication capabilities to one or more DU units 308. The units 302, 304 can include one or more base stations, macro base stations, micro base stations, remote radio heads, etc. and/or any combination thereof.

In lower layer split architecture environment, a CPRI bandwidth requirement for NR can be 100 s of Gb/s. CPRI compression can be implemented in the DU and RU (as shown in FIG. 3). In 5G communications systems, compressed CPRI over Ethernet frame is referred to as eCPRI and is the recommended fronthaul network. The architecture can allow for standardization of fronthaul/midhaul, which can include a higher layer split (e.g., Option 2 or Option 3-1 (Upper/Lower RLC split architecture)) and fronthaul with L1-split architecture (Option 7).

In some implementations, the lower layer-split architecture (e.g., Option 7) can include a receiver in the uplink, joint processing across multiple transmission points (TPs) for both DL/UL, and transport bandwidth and latency requirements for ease of deployment. Further, the current subject matter's lower layer-split architecture can include a split between cell-level and user-level processing, which can include cell-level processing in remote unit ("RU") and user-level processing in DU. Further, using the current subject matter's lower layer-split architecture, frequency-domain samples can be transported via Ethernet fronthaul, where the frequency-domain samples can be compressed for reduced fronthaul bandwidth.

Figure 4:
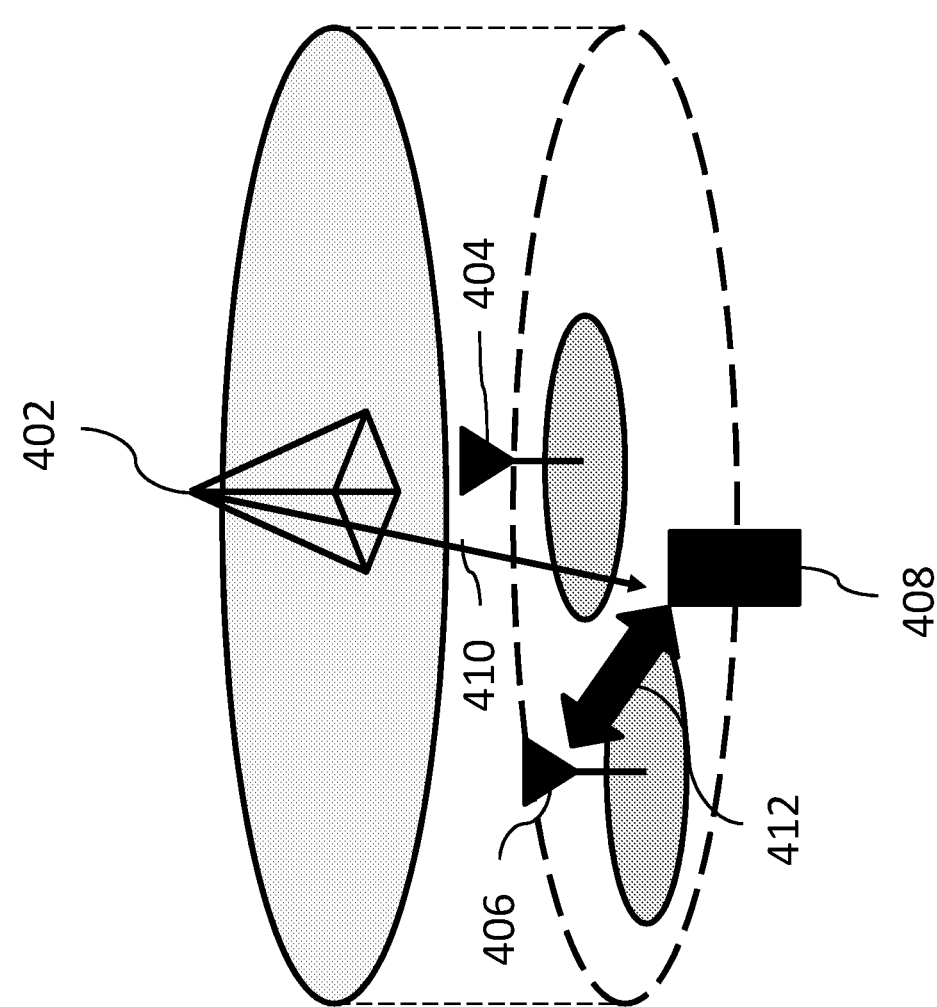
FIG. 4 illustrates an exemplary 3GPP split architecture to provide its users with use of higher frequency bands.

FIG. 4 illustrates an exemplary communications system 400 that can implement a 5G technology and can provide its users with use of higher frequency bands (e.g., greater than 10 GHz). The system 400 can include a macro cell 402 and small cells 404 and 406.

A mobile device 408 can be configured to communicate with one or more of the small cells 404, 406. The system 400 can allow splitting of control planes (C-plane) and user planes (U-plane) between the macro cell 402 and small cells 404, 406, where the C-plane and U-plane are utilizing different frequency bands. In particular, the small cells 402, 404 can be configured to utilize higher frequency bands when communicating with the mobile device 408. The macro cell 402 can utilize existing cellular bands for C-plane communications. The mobile device 408 can be communicatively coupled via U-plane 412, where the small cell (e.g., small cell 406) can provide higher data rate and more flexible/cost/energy efficient operations. The macro cell 402, via C-plane 410, can maintain good connectivity and mobility. Further, in some cases, LTE and NR can be transmitted on the same frequency.

Figure 5A:
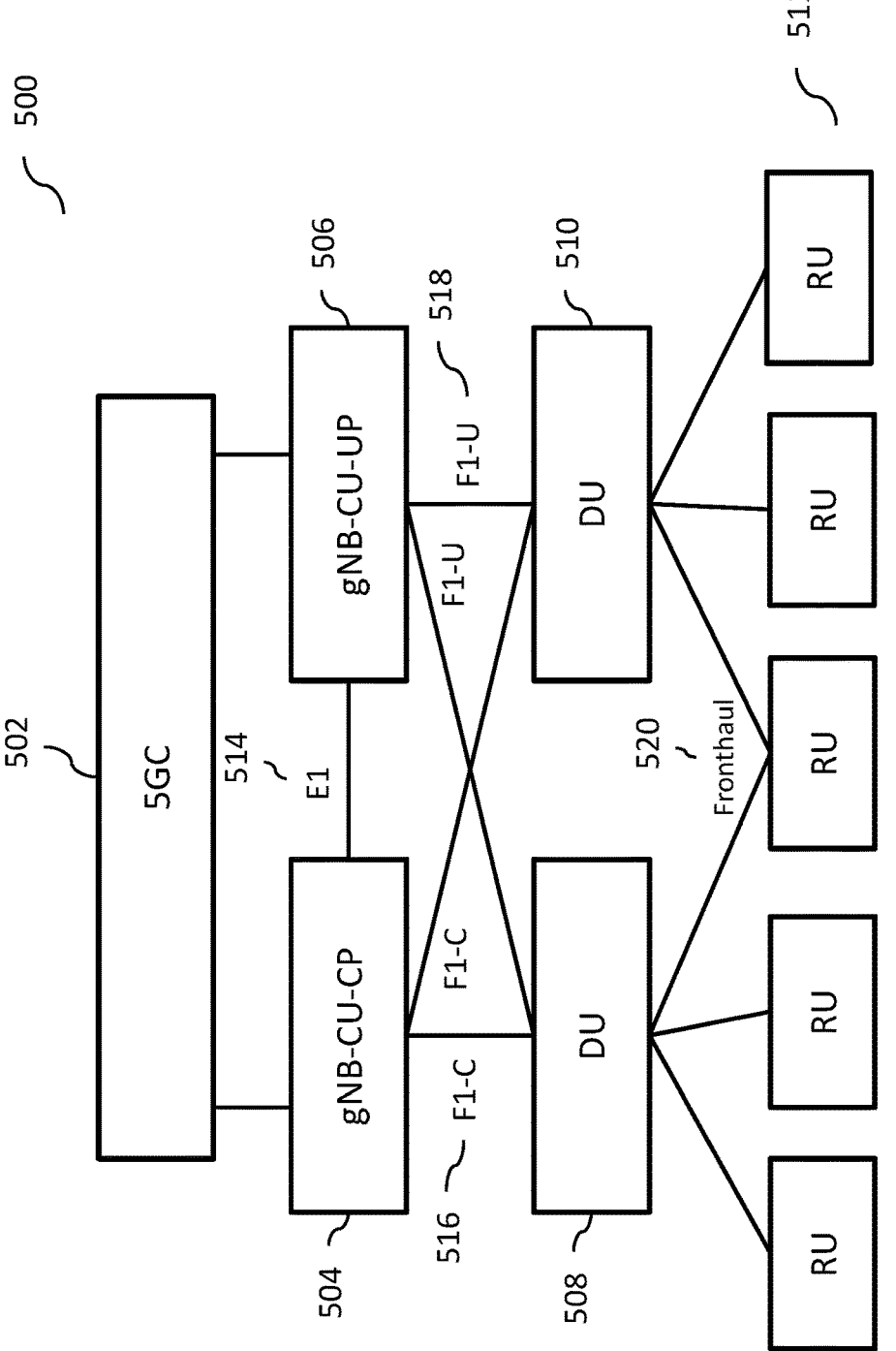
FIG. 5a illustrates an exemplary 5G wireless communication system.

FIG. 5a illustrates an exemplary 5G wireless communication system 500, according to some implementations of the current subject matter. The system 500 can be configured to have a lower layer split architecture in accordance with Option 7-2. The system 500 can include a core network 502 (e.g., 5G Core) and one or more gNodeBs (or gNBs), where the gNBs can have a centralized unit gNB-CU. The gNB-CU can be logically split into control plane portion, gNB-CU-CP, 504 and one or more user plane portions, gNB-CU-UP, 506. The control plane portion 504 and the user plane portion 506 can be configured to be communicatively coupled using an E1 communication interface 514 (as specified in the 3GPP Standard). The control plane portion 504 can be configured to be responsible for execution of the RRC and PDCP protocols of the radio stack.

The control plane and user plane portions 504, 506 of the centralized unit of the gNB can be configured to be communicatively coupled to one or more distributed units (DU) 508, 510, in accordance with the higher layer split architecture. The distributed units 508, 510 can be configured to execute RLC, MAC and upper part of PHY layers protocols of the radio stack. The control plane portion 504 can be configured to be communicatively coupled to the distributed units 508, 510 using F1-C communication interfaces 516, and the user plane portions 506 can be configured to be communicatively coupled to the distributed units 508, 510 using F1-U communication interfaces 518. The distributed units 508, 510 can be coupled to one or more remote radio units (RU) 512 via a fronthaul network 520 (which may include one or switches, links, etc.), which in turn communicate with one or more user equipment (not shown in FIG. 5a). The remote radio units 512 can be configured to execute a lower part of the PHY layer protocols as well as provide antenna capabilities to the remote units for communication with user equipments (similar to the discussion above in connection with FIGS. 1a-2).

Figure 5B:
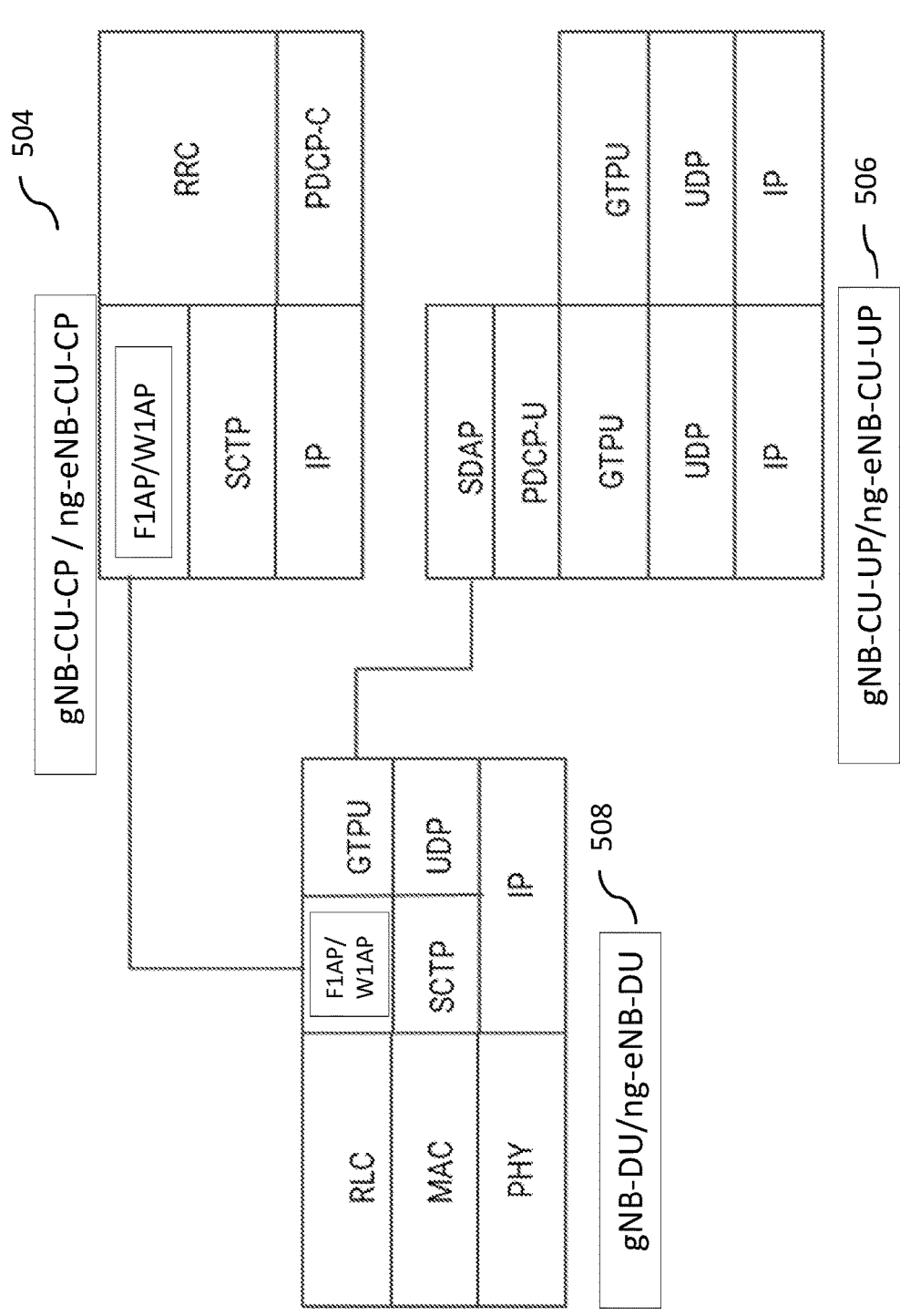
FIG. 5b illustrates an exemplary layer architecture of the split gNB and/or a split ng-eNB (e.g., next generation eNB that may be connected to 5 GC)

FIG. 5b illustrates an exemplary layer architecture 530 of the split gNB. The architecture 530 can be implemented in the communications system 500 shown in FIG. 5a, which can be configured as a virtualized disaggregated radio access network (RAN) architecture, whereby layers L1, L2, L3 and radio processing can be virtualized and disaggregated in the centralized unit(s), distributed unit(s) and radio unit(s). As shown in FIG. 5b, the gNB-DU 508 can be communicatively coupled to the gNB-CU-CP control plane portion 504 (also shown in FIG. 5a) and gNB-CU-UP user plane portion 506. Each of components 504, 506, 508 can be configured to include one or more layers.

The gNB-DU 508 can include RLC, MAC, and PHY layers as well as various communications sublayers. These can include an F1 application protocol (F1-AP) sublayer, a GPRS tunneling protocol (GTPU) sublayer, a stream control transmission protocol (SCTP) sublayer, a user datagram protocol (UDP) sublayer and an internet protocol (IP) sublayer. As stated above, the distributed unit 508 may be communicatively coupled to the control plane portion 504 of the centralized unit, which may also include F1-AP, SCTP, and IP sublayers as well as radio resource control, and PDCP-control (PDCP-C) sublayers. Moreover, the distributed unit 508 may also be communicatively coupled to the user plane portion 506 of the centralized unit of the gNB. The user plane portion 506 may include service data adaptation protocol (SDAP), PDCP-user (PDCP-U), GTPU, UDP and IP sublayers.

Figure 5C:
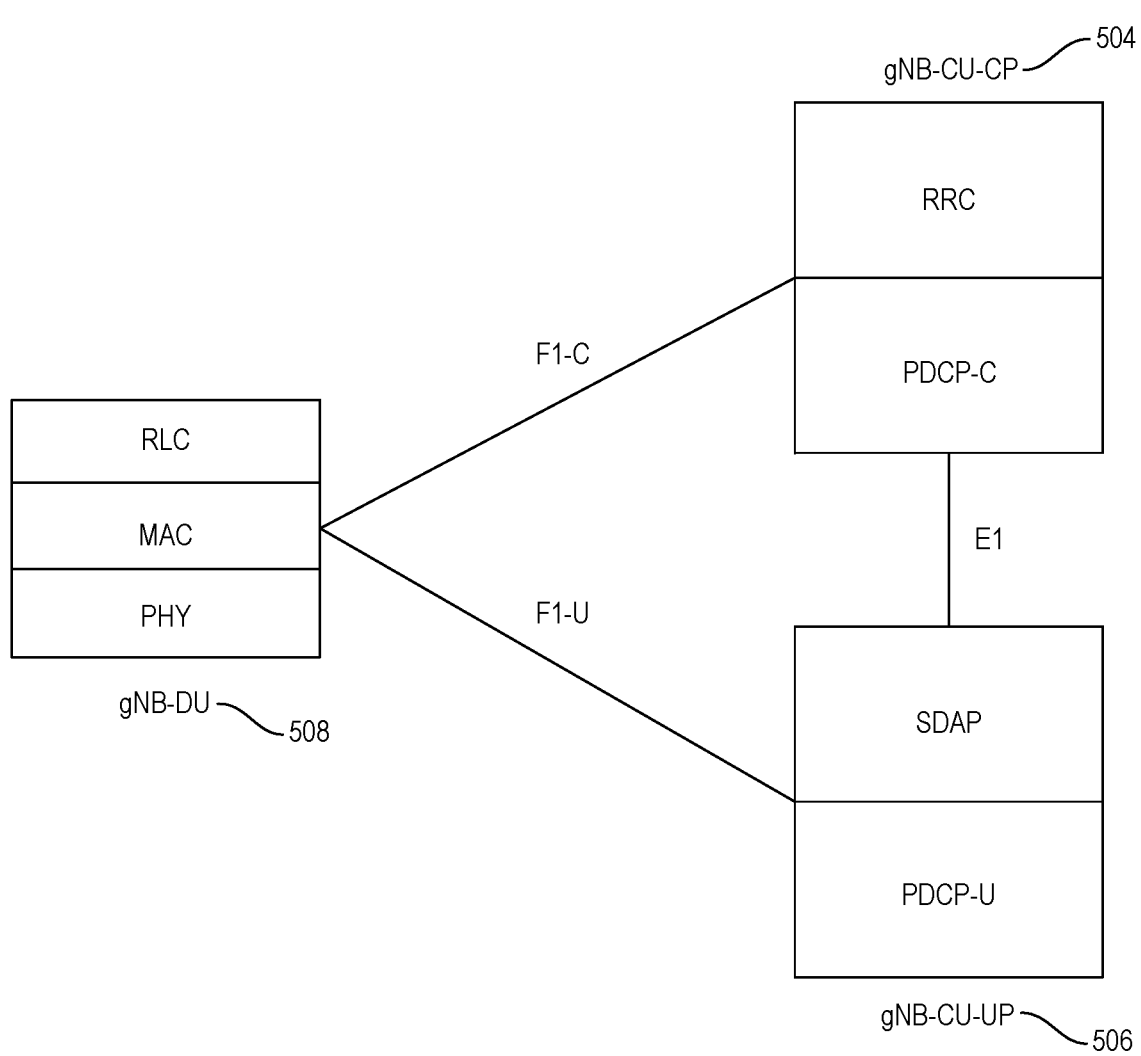
FIG. 5c illustrates an exemplary functional split in the gNB architecture shown in FIGS. 5a-b.

FIG. 5c illustrates an exemplary functional split in the gNB architecture shown in FIGS. 5a-b. As shown in FIG. 5c, the gNB-DU 508 may be communicatively coupled to the gNB-CU-CP 504 and GNB-CU-UP 506 using an F1-C communication interface. The gNB-CU-CP 504 and GNB-CU-UP 506 may be communicatively coupled using an E1 communication interface. The higher part of the PHY layer (or Layer 1) may be executed by the gNB-DU 508, whereas the lower parts of the PHY layer may be executed by the RUs (not shown in FIG. 5c). As shown in FIG. 5c, the RRC and PDCP-C portions may be executed by the control plane portion 504, and the SDAP and PDCP-U portions may be executed by the user plane portion 506.

Some of the functions of the PHY layer in 5G communications network can include error detection on the transport channel and indication to higher layers, FEC encoding/ decoding of the transport channel, hybrid ARQ soft-combining, rate matching of the coded transport channel to physical channels, mapping of the coded transport channel onto physical channels, power weighting of physical channels, modulation and demodulation of physical channels, frequency and time synchronization, radio characteristics measurements and indication to higher layers, MIMO antenna processing, digital and analog beamforming, RF processing, as well as other functions.

The MAC sublayer of Layer 2 can perform beam management, random access procedure, mapping between logical channels and transport channels, concatenation of multiple MAC service data units (SDUs) belonging to one logical channel into transport block (TB), multiplexing/demultiplexing of SDUs belonging to logical channels into/from TBs delivered to/from the physical layer on transport channels, scheduling information reporting, error correction through HARQ, priority handling between logical channels of one UE, priority handling between UEs by means of dynamic scheduling, transport format selection, and other functions. The RLC sublayer's functions can include transfer of upper layer packet data units (PDUs), error correction through ARQ, reordering of data PDUs, duplicate and protocol error detection, re-establishment, etc. The PDCP sublayer can be responsible for transfer of user data, various functions during re-establishment procedures, retransmission of SDUs, SDU discard in the uplink, transfer of control plane data, and others.

Layer 3's RRC sublayer can perform broadcasting of system information to NAS and AS, establishment, maintenance and release of RRC connection, security, establishment, configuration, maintenance and release of point-point radio bearers, mobility functions, reporting, and other functions.

III. Beamforming Architecture

In some implementations, the current subject matter relates to a beam processing architecture that may be configured to process antenna beams in various wireless communication system (e.g., 4G, 4G LTE, 5G, 6G, etc.). The architecture may be configured to include one or more field-programmable gate arrays (FPGAs) that may be programmed to execute beam processing in accordance with one or more implementations of the current subject matter.

Beam processing (and/or beamforming) can refer to processing of signals for directional signal transmission or reception. This can be achieved by combining elements in an antenna in such a way that signals at particular angles experience constructive interference while others—destructive interference. Beam processing can be used for transmission and receiving to achieve spatial selectivity. In wireless communications, there are two classes of beamforming: a direction of arrival beamforming (e.g., adjustment of receive or transmit antenna direction), and Eigen beamforming (e.g., maximization of signal power at the receive antenna based on various criteria). To maximize throughput of multi-layer antenna systems, precoding is used for multi-layer beamforming, where precoding can be a beamforming scheme to support multi-layer transmission in a multiple input multiple output (MIMO) system. Using precoding, multiple streams cab be transmitted from an antenna using independent weights per antenna to maximize throughput at the receiver output.

In some implementations, the current subject matter may be configured to provide for an efficient use of an input memory store and/or any other memory during processing of antenna carrier symbols that may be received by one or more components of a base station in a wireless communication system. The input memory store may be incorporated into the base station and/or any of its components (e.g., remote radio head, baseband unit, radio interface unit, distributed unit, centralized unit, etc.). Each OFDM symbol may be part of a radio frame that may be received by one or more antennas of a base station. Each radio frame includes 10 subframes or 10 slots, where each slot is equal to 1 ms and includes 14 or more symbols.

In existing beam processing architectures, a separate memory is typically needed for each antenna of a base station, which may lead to having 64 separate memories for each antenna. The base station may be configured to execute data calculations once all data has been received and then use the time for all 64 antenna carrier symbols (AxC) to be received to determine a full set of output data results. An incoming data must be stored while the previously processed AxC data is used, thereby requiring a ping pong memory storage architecture. As such, conventional architectures may require two AxCs depth of storage per all 64 AxCs. Additionally, because there are many inputs from the base station antennas that generate a lesser number of layer outputs (i.e., many inputs generate fewer outputs), this makes conventional systems inefficient in memory and data use.

In some implementations, the current subject matter may be configured to process with antenna carrier symbols and to wait for all input data associated with received with antenna carrier symbols for a "pass" to be received before output data for that pass can be calculated, thereby leading to lower latency through the design. Results of each such "pass" may be used in the next "pass", which may be configured to reduce storage capacity that may be needed to store data associated with a single antenna carrier symbols worth of data per output layer. Since the number of output layers is less than the input antennas, this may lead to an overall reduction in data storage. Further, once the data for a "pass" has been used (e.g., combined with newly incoming data), it is no longer needed, thereby freeing up data for another "pass". The current subject matter may be configured to include input data stores of two AxCs in a ping-pong data buffer arrangement. This may reduce the overall memory storage requirements by a factor of the number of "passes" available. Higher clock rates and/or smaller data blocks and/or longer times between AxC cycles may allow for greater numbers of "passes".

In some implementations, the current subject matter may be configured to process one or more antenna carrier symbols received on an uplink communication link by one or more antennas and/or one or more components of a base station. The antenna carrier symbols may be processed using one or more processing elements.

Figure 6:
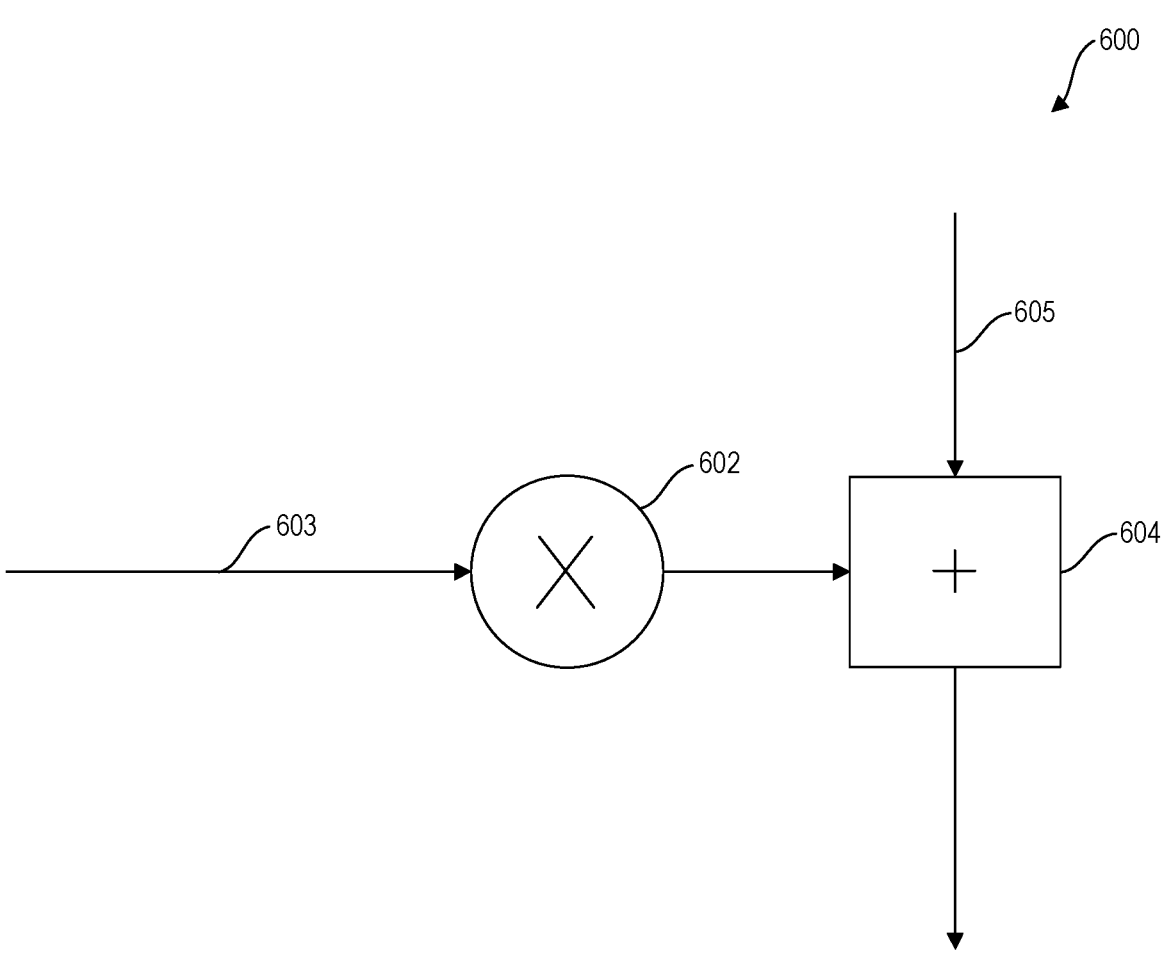
FIG. 6 illustrates an exemplary processing element, according to some implementations of the current subject matter.

FIG. 6 illustrates an exemplary processing element 600, according to some implementations of the current subject matter. The processing element 600 may include a multiplier component 602 and an adder component 604 communicatively coupled to the multiplier component 602. The processing element 600 may be configured to execute one or more digital signal processing functionalities, such as complex multiply-accumulate functions, where signal multiplication functions may be executed by the multiplier component 602 and signal accumulate functions may be executed by the adder component 604.

In some implementations, the processing element 600 may be configured to receive a first input data signal 603 and a second input data signal 605. The first input data signal 603 may include a complex sample of an antenna carrier symbol. The second input data signal 605 may be indicative of a corresponding antenna weight (or beamforming weight) that may be assigned to the complex sample of the antenna carrier symbol received as first input data signal 603. The multiplier component 602 may be configured to execute a multiplication function that may multiple the complex sample of the antenna carrier symbol received via the first input data signal 603 by the corresponding antenna weight receive via the second input data signal 605. The resulting output may be cascaded to another processing element 600 (not shown in FIG. 6, but discussed below in connection with FIG. 7), where the complex sample of the next antenna carrier symbol may be read by the processing element and processed using its corresponding antenna weight that is assigned to such next antenna carrier symbol.

Figure 7:
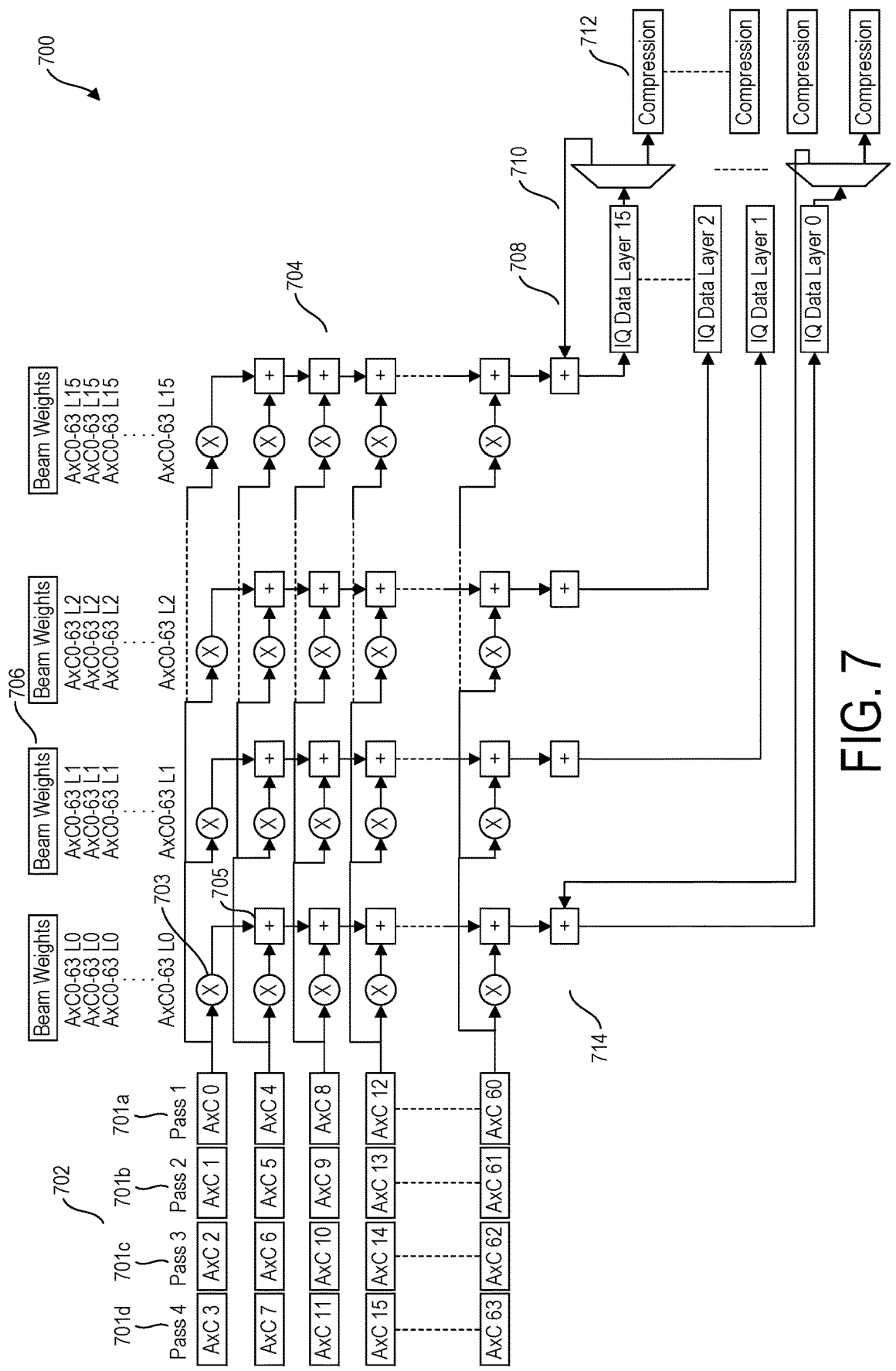
FIG. 7 illustrates an exemplary beam processing system, according to some implementations of the current subject matter.

FIG. 7 illustrates an exemplary beam processing system 700, according to some implementations of the current subject matter. The beam processing system 700 may be incorporated into a field programmable gate array (FPGA), where the FPGA may be programmed to execute one or more functions described herein. The system 700 may be configured to process uplink and/or downlink signals.

The system 700 may include one or more input data receiving components 702, one or more digital signal processing components 704, one or more beam weight register components 706, one or more output layer components 708, one or more data storage components 710, and one or more compression output components 712. The components 702-712 may include any combination of hardware and/or software. Moreover, the components 702-712 may be disposed on a single computing device and/or multiple computing devices.

The input data receiving component 702 may be configured to receive and/or temporarily store one or more antenna carrier symbols. In some exemplary, non-limiting implementations, the input data receiving component 702 may be configured to receive 64 data inputs corresponding to 64 antenna carrier symbols, e.g., AxC0-AxC63, as shown in FIG. 7. The system 700 may be programmed to arrange the input antenna carrier symbols into one or more groups and/or columns/passes, where each group of input antenna carrier symbols may include the same number of received antenna carrier symbols.

As shown in FIG. 7, the input antenna carrier symbols may be arranged into four groups 701 (*a, b, c, d*) of 16 antenna carrier symbols (corresponding to 16×4=64 antenna carrier symbols). For instance, group 701*a* may include antenna carrier symbols AxC0, AxC4, AxC8, . . . . AxC60; group 701*b* may include antenna carrier symbols AxC1, AxC5, AxC9, . . . . AxC61; group 701*c* may include antenna carrier symbols AxC2, AxC6, AxC10, . . . . AxC62; and group 701*d* may include antenna carrier symbols AxC3, AxC7, AxC11, . . . . AxC63. Each group of antenna carrier symbols may be arranged in columns as shown in FIG. 7. As can be understood, any arrangement of antenna carrier symbols may be possible.

Each group 701 of input antenna carrier symbols may be processed by one or more digital signal processing elements or components 704. Each digital signal processing component 704 may be similar to the digital signal processing component 600 shown in FIG. 6. It may include a multiplier stage 703 (similar to component 602 shown in FIG. 6) and an adder stage 705 (similar to component 604 shown in FIG. 6). In particular, each multiplier stage 703 of the digital signal processing component 704, as part of processing the antenna carrier symbols, may be configured to multiply an antenna carrier symbol that it receives by a corresponding beam weight that may be retrieved from one of the register components 706.

The digital processing components 704 may be organized in rows and columns, where rows corresponding to each of the rows of antenna carrier symbols (e.g., AxC0-AxC3, etc.) and columns corresponding to each of the beam weight registers 706. The number of digital processing elements (e.g., components 704) may be determined based on a number of output layers (L0-L15) multiplied by the number of antennas and divided by a number of iterations (e.g., "passes" or groups 701 of antenna carrier symbols), where the number of digital processing elements in a particular column may be determined based on a number of antennas divided by the number iterations (e.g., "passes").

The beam weights provided by the components 706 may be known and/or predetermined. The components 706 may store beam weights for multiplying each antenna carrier symbol in accordance with an output layer. Each beam weight may be assigned to a specific antenna carrier symbol. In some implementations, one or more beam weights may be duplicated and/or may be symmetrical. In this case, any properties associated with duplicated and/or symmetrical beam weights may be reflected in the following processing of data between the input data receiving component 702 and one or more multiplier stages 703 of one or more digital signal processing components 704. This, in turn, may also affect the amount of processed data stored by one or more components 706.

As shown in FIG. 7, there may be 16 sets of 64 beam weights 707 (0, . . . , n), where n=15, one set of 64 beam weights per each output layer L0-L15. This means that, for example, for output layer L0, each input antenna carrier symbol will be multiplied using a multiplier stage 703 of each processing component 704 by a corresponding beam weight for each output layer. For example, antenna carrier symbol AxC0 will be multiplied by a beam weight corresponding to AxC0 for layer L0, a beam weight corresponding to AxC0 for layer L1, . . . , a beam weight corresponding to AxC0 for layer L15. Similar multiplication will occur using multiplier stages 703 of components 704 for other antenna carrier symbols AxCn (where n=0, . . . , 63).

Upon multiplication of antenna carrier symbols in the first group 701*a* of antenna carrier symbols by the corresponding beam weights, the partial products resulting from this multiplication may be transmitted to corresponding output I/Q data layers 0 . . . 15 708. The partial products of antenna carrier symbols and corresponding beam weights may be temporarily stored by the components 710. The partial products are stored until all groups 701 of antenna carrier symbols are processed through the digital signal processing components 704.

While each partial product of the antenna carrier symbol in one group 701 (e.g., 701*a*) and its corresponding beam weight are stored, the next group 701 (e.g., 701*b*) is being processed by the digital signal processing components 704 in the same way as the antenna carrier symbols in the previous group have been processed. The previously stored partial product may then be fed back to the corresponding adder stage 714 and/or adder stage 705 for combination with the next processed group 701 of the antenna carrier symbols. The combined previous and next groups 701 of processed antenna carrier symbols is then stored in the corresponding I/Q data layer and may again be fed back to the corresponding adder stage 714 and/or adder stage 705 for combination for the next group (e.g., 701*c*) of processed (e.g., multiplied) antenna carrier symbols. The storage and feeding back of such partial products and subsequent combination continues until all groups 701 have been combined and stored. Once it is determined that all such groups 701 have been processed and combined, the system 700 may be configured to generate an output and transmit it to a corresponding compression stage 712 (each I/Q data layer 0 . . . 15 corresponds to its own compression output 712).

For example, I/Q data layer/output layer 0 may receive all four groups 701 of antenna carrier symbols that have been multiplied by the respective beam weights AxC0-63 L0. Similarly, I/Q data layer/output layer 1 may receive all four groups 701 of antenna carrier symbols that have been multiplied by the respective beam weights AxC0-63 L1, and so on. Once each particular group 701 of antenna carrier symbols is processed, it may be discarded from the input components 702, thereby freeing up memory that may be needed for processing other groups 701 of antenna carrier symbols.

Figure 8:
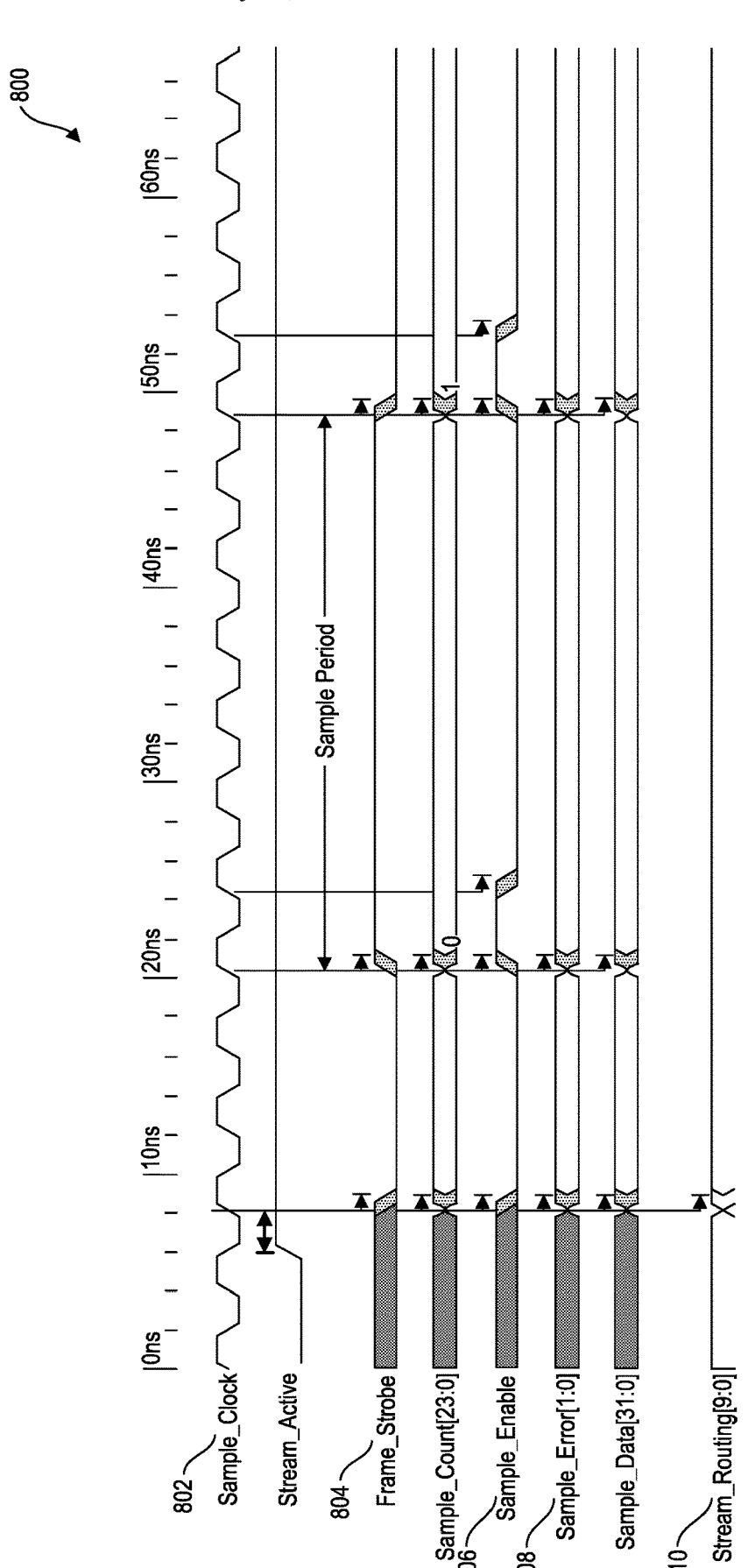
FIG. 8 illustrates an exemplary timing diagram for processing data streams of input antenna carrier symbols by the system shown in FIG. 7, according to some implementations of the current subject matter.

FIG. 8 illustrates an exemplary timing diagram 800 for processing data streams of input antenna carrier symbols by the system 700 shown in FIG. 7, according to some implementations of the current subject matter. The data streams are processed using a clock 802. Any active signals may be quasi-static signals that indicate when a particular data stream is active and may be asynchronous to a data stream. All other signals may be synchronous to the clock 802. To process the input data signals, a frame strobe 804 may be set once every 10 ms for that signal and may be set for a single sample duration. The enable signal 806 may indicate when other signals are to be decoded. This may be driven periodically for constant rate time domain samples (as shown in FIG. 8) and/or as a block for a burst of clocks for a frequency domain symbol of data. The data may be set in any desired format. For example, the data may have a 16 bit signed Q word in bits [31:16] and 16 bit signed I work in bits [15:0]. The error flag 808 may be a single bit to indicate saturated or erroneous data with bit 1 for the Q word lane and bit 0 for the I word lane. The stream routing 810 may be an optional bus to indicate which data source or AxC is present on the bus. It is intended to be samples when the enable signal is asserted but can be set before, after or even between enable strobes. This is used to allow more than one AxC to be multiplexed onto a single bus if this is appropriate. This is useful for frequency domain symbol data which are multiplexed into memories and saves logic spent demultiplexing and then re-multiplexing data streams.

Figure 9:
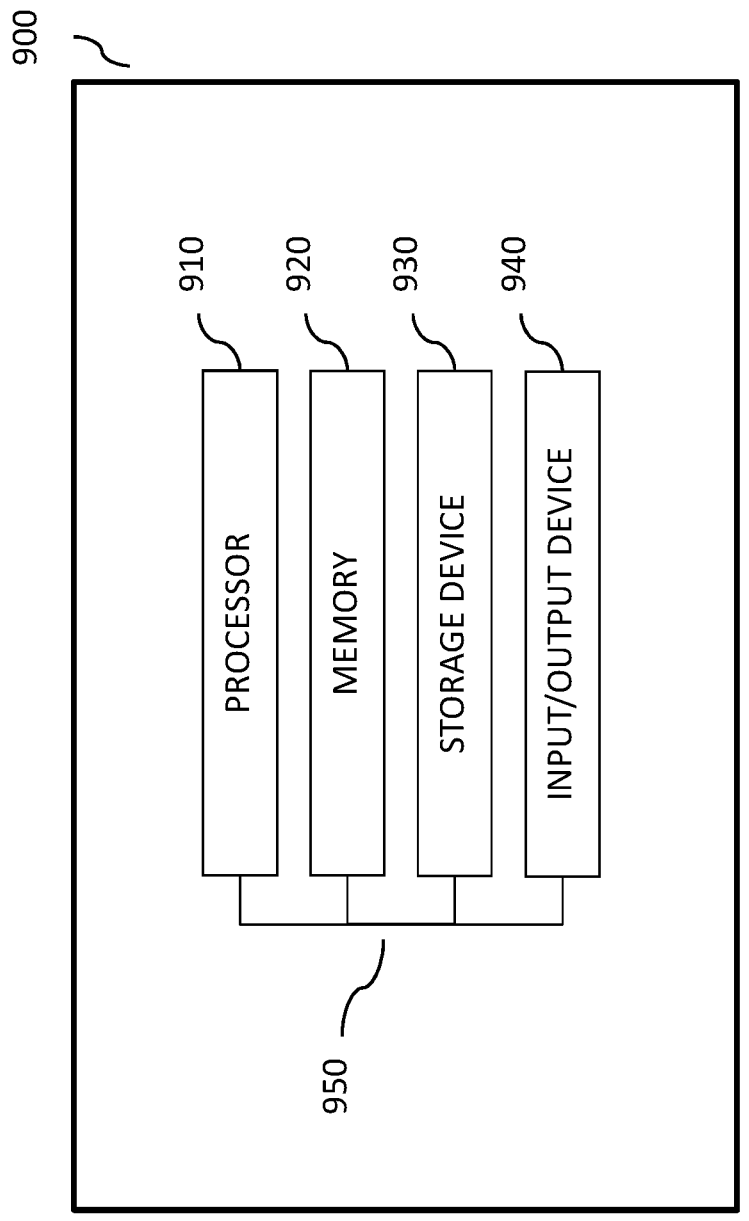
FIG. 9 illustrates an exemplary system, according to some implementations of the current subject matter.

In some implementations, the current subject matter can be configured to be implemented in a system 900, as shown in FIG. 9. The system 900 can include one or more of a processor 910, a memory 920, a storage device 930, and an input/output device 940. Each of the components 910, 920, 930 and 940 can be interconnected using a system bus 950. The processor 910 can be configured to process instructions for execution within the system 600. In some implementations, the processor 910 can be a single-threaded processor. In alternate implementations, the processor 910 can be a multi-threaded processor. The processor 910 can be further configured to process instructions stored in the memory 920 or on the storage device 930, including receiving or sending information through the input/output device 940. The memory 920 can store information within the system 900. In some implementations, the memory 920 can be a computer-readable medium. In alternate implementations, the memory 920 can be a volatile memory unit. In yet some implementations, the memory 920 can be a non-volatile memory unit. The storage device 930 can be capable of providing mass storage for the system 900. In some implementations, the storage device 930 can be a computer-readable medium. In alternate implementations, the storage device 930 can be a floppy disk device, a hard disk device, an optical disk device, a tape device, non-volatile solid state memory, or any other type of storage device. The input/output device 940 can be configured to provide input/output operations for the system 900. In some implementations, the input/output device 940 can include a keyboard and/or pointing device. In alternate implementations, the input/output device 940 can include a display unit for displaying graphical user interfaces.

FIG. 10 illustrates an exemplary method 1000 for processing of data signals in a wireless communication system, according to some implementations of the current subject matter. The method 1000 may be executed by a base station and/or one or more of its components that may incorporate one or more components of the system 700 shown in FIG. 7. The method 1000 may be executed using, for example, a field programmable gate array. At 1002, an input data signal having a plurality of portions of antenna carrier symbols may be received by the system 700. The antenna carrier symbols may be organized into one or more portions or groups 701, as discussed above. As shown in FIG. 7, the antenna carrier symbols may be grouped into four groups of antenna carrier symbols and processed serially by the corresponding digital signal processing elements 704.

At 704, one or more beam weights may be assigned to one or more antenna carrier symbols in each portion in the plurality of portions of antenna carrier symbols. The beam weights (AxC0-63 L0 . . . L15) may correspond to each output layer and may correspond to each specific antenna carrier symbol that is received, e.g., AxC0 will be assigned beam weights AxC0 L0, AxC0 L1, . . . AxC0 L15, etc. The number of digital processing elements (e.g., components 704) may be determined based on a number of layers multiplied by the number of antennas and divided by a number of iterations (e.g., "passes" as discussed above), where the number of digital processing elements in a particular column may be determined based on a number of antennas divided by the number iterations (e.g., "passes").

At 706, each antenna carrier symbol in the portion or group 701 of antenna carrier symbols in the plurality of portions of antenna carrier symbols may be processed (e.g., multiplied) using at least one assigned beam weight in one or more assigned beam weights to generate a processed portion (e.g., a partial product of the antenna carrier symbol multiplied by the assigned beam weight) of antenna carrier symbols. The antenna carrier symbols may be processed using a multiplier and an adder stage of each corresponding digital processing element 704. The multiplier stage may be configured to multiple antenna carrier symbol by its respective assigned beam weight.

At 708, the processed portion of antenna carrier symbols may be stored while processing of another portion of antenna carrier symbols in the plurality of portions of antenna carrier symbols may be performed. For example, the processed antenna carrier symbols in the portion 701a may be stored (e.g., in the I/Q data layers L0-L15) while antenna carrier symbols in the portion 701b are being processed by the digital processing elements 704.

At 710, the stored processed portion of antenna carrier symbols may be combined with the processed another portion of antenna carrier symbols to generate an output data signal. The combination of the processed portions may be performed by an adder stage 714 shown in FIG. 7. Once all four groups 701 of the antenna carrier symbols are processed and combined at the respective output layers 708, they may be outputted.

In some implementations, the current subject matter can include one or more of the following optional features. In some implementations, each portion of antenna carrier symbols may be processed serially. Further, each antenna carrier symbol may be processed by multiplying at least one assigned beam weight by each antenna carrier symbol to generate the processed portion of antenna carrier symbols. The stored processed portion of antenna carrier symbols may be added to the processed antenna carrier symbols in another portion of antenna carrier symbols. In some implementations, the combination of processed antenna carrier symbol from different portions may include adding all processed portions in the plurality of antenna carrier symbols in the input data signal, and generating the output signal using all added processed portions.

In some implementations, the beam processing architecture may be further configured to temporarily store, e.g., in a memory location, each portion in the plurality of portions of antenna carrier symbols prior to the processing. The architecture may further discard temporarily stored portion of antenna carrier symbols upon processing of that portion from the memory location, and temporarily store, e.g., in the memory location, another portion in the plurality of portions of antenna carrier symbols after discarding.

In some implementations, the architecture may include a base station that may be configured to receive input signals, assign beam weights, process antenna carrier symbols, store processed symbols, and then combine newly processed symbols with already processed stored symbols. The base station may include at least one of the following communication components: one or more remote radio units, one or more radio interface units, and one or more distributed units. One or more radio interface units may be configured to perform at least one of the following: receive the input data signal, transmit the generated output data signal, and any combination thereof. The base station may be an eNodeB base station, a gNodeB base station, and/or any combination thereof. Further, the base station may be operating in a long term evolution communications system and/or a new radio communications system.

The systems and methods disclosed herein can be embodied in various forms including, for example, a data processor, such as a computer that also includes a database, digital electronic circuitry, firmware, software, or in combinations of them. Moreover, the above-noted features and other aspects and principles of the present disclosed implementations can be implemented in various environments. Such environments and related applications can be specially constructed for performing the various processes and operations according to the disclosed implementations or they can include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware. For example, various general-purpose machines can be used with programs written in accordance with teachings of the disclosed implementations, or it can be more convenient to construct a specialized apparatus or system to perform the required methods and techniques.

The systems and methods disclosed herein can be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

As used herein, the term "user" can refer to any entity including a person or a computer.

Although ordinal numbers such as first, second, and the like can, in some situations, relate to an order; as used in this document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

The foregoing description is intended to illustrate but not to limit the scope of the invention, which is defined by the scope of the appended claims. Other implementations are within the scope of the following claims.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including, but not limited to, acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally, but not exclusively, remote from each other and typically interact through a communication network. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed:

1. A computer implemented method, comprising:
   receiving an input data signal having a plurality of portions of antenna carrier symbols;
   assigning one or more beam weights to one or more antenna carrier symbols in each portion in the plurality of portions of antenna carrier symbols;
   processing each antenna carrier symbol in a portion of antenna carrier symbols in the plurality of portions of antenna carrier symbols using at least one assigned beam weight in the one or more assigned beam weights to generate a processed portion of antenna carrier symbols;
   storing the processed portion of antenna carrier symbols while performing the processing of another portion of antenna carrier symbols in the plurality of portions of antenna carrier symbols; and
   combining the stored processed portion of antenna carrier symbols with the processed another portion of antenna carrier symbols to generate an output data signal.

2. The method according to claim 1, wherein the processing includes serially processing each portion of antenna carrier symbols in the plurality of portions of antenna carrier symbols.

3. The method according to claim 1, wherein the processing includes processing each antenna carrier symbol in the portion of antenna carrier symbols by multiplying the at least one assigned beam weight in the one or more assigned beam weights by each antenna carrier symbol to generate the processed portion of antenna carrier symbols.

4. The method according to claim 3, wherein the combining includes adding the stored processed portion of antenna carrier symbols to the processed another portion of antenna carrier symbols.

5. The method according to claim 4, wherein the combining includes
   adding all processed portions in the plurality of antenna carrier symbols in the input data signal; and
   generating the output signal using all added processed portions.

6. The method according to claim 1, further comprising temporarily storing, in a memory location, each portion in the plurality of portions of antenna carrier symbols prior to the processing.

7. The method according to claim 6, further comprising
   discarding temporarily stored portion of antenna carrier symbols upon performing the processing of that portion from the memory location; and
   temporarily storing, in the memory location, another portion in the plurality of portions of antenna carrier symbols after the discarding.

8. The method according to claim 1, wherein at least one of the receiving, the assigning, the processing, the storing and the combining is performed by a base station.

9. The method according to claim 8, wherein the base station includes at least one of the following communication components: one or more remote radio units, one or more radio interface units, and one or more distributed units.

10. The method according to claim 9, wherein the one or more radio interface units is configured to perform at least one of the following: receive the input data signal, transmit the generated output data signal.

11. The method according to claim 8, where the base station includes at least one of the following: an eNodeB base station, a gNodeB base station, and any combination thereof.

12. The method according to claim 11, wherein the base station is a base station operating in at least one of the following communications systems: a long term evolution communications system and a new radio communications system.

13. A system comprising:
   at least one programmable processor; and
   a non-transitory machine-readable medium storing instructions that, when executed by the at least one programmable processor, cause the at least one programmable processor to perform operations comprising:
      receiving an input data signal having a plurality of portions of antenna carrier symbols;
      assigning one or more beam weights to one or more antenna carrier symbols in each portion in the plurality of portions of antenna carrier symbols;
      processing each antenna carrier symbol in a portion of antenna carrier symbols in the plurality of portions of antenna carrier symbols using at least one assigned beam weight in the one or more assigned beam weights to generate a processed portion of antenna carrier symbols;
      storing the processed portion of antenna carrier symbols while performing the processing of another portion of antenna carrier symbols in the plurality of portions of antenna carrier symbols; and combining the stored processed portion of antenna carrier symbols with the processed another portion of antenna carrier symbols to generate an output data signal.

14. The system according to claim 13, wherein the processing includes serially processing each portion of antenna carrier symbols in the plurality of portions of antenna carrier symbols.

15. The system according to claim 13, wherein the processing includes processing each antenna carrier symbol in the portion of antenna carrier symbols by multiplying the at least one assigned beam weight in the one or more assigned beam weights by each antenna carrier symbol to generate the processed portion of antenna carrier symbols.

16. The system according to claim 15, wherein the combining includes adding the stored processed portion of antenna carrier symbols to the processed another portion of antenna carrier symbols.

17. The system according to claim 13, wherein the operations further comprise temporarily storing, in a memory location, each portion in the plurality of portions of antenna carrier symbols prior to the processing.

18. The system according to claim 17, wherein the operations further comprise discarding temporarily stored portion of antenna carrier symbols upon performing the processing of that portion from the memory location; and temporarily storing, in the memory location, another portion in the plurality of portions of antenna carrier symbols after the discarding.

19. The system according to claim 13, wherein at least one of the receiving, the assigning, the processing, the storing and the combining is performed by a base station.

20. A computer program product comprising a non-transitory machine-readable medium storing instructions that, when executed by at least one programmable processor, cause the at least one programmable processor to perform operations comprising:

receiving an input data signal having a plurality of portions of antenna carrier symbols;

assigning one or more beam weights to one or more antenna carrier symbols in each portion in the plurality of portions of antenna carrier symbols;

processing each antenna carrier symbol in a portion of antenna carrier symbols in the plurality of portions of antenna carrier symbols using at least one assigned beam weight in the one or more assigned beam weights to generate a processed portion of antenna carrier symbols;

storing the processed portion of antenna carrier symbols while performing the processing of another portion of antenna carrier symbols in the plurality of portions of antenna carrier symbols; and combining the stored processed portion of antenna carrier symbols with the processed another portion of antenna carrier symbols to generate an output data signal.

* * * * *